United States Patent [19]

Powsner et al.

[11] Patent Number: 5,640,549
[45] Date of Patent: Jun. 17, 1997

[54] METHOD AND APPARATUS FOR GRAPHICAL MODELING OF PSYCHIATRIC AND MEDICAL RECORDS

[76] Inventors: Seth M. Powsner, 285 Ridge Rd., Hamden, Conn. 06517; Edward Rolf Tufte, 1161 Sperry Rd., Cheshire, Conn. 06410

[21] Appl. No.: 254,314

[22] Filed: Jun. 6, 1994

Related U.S. Application Data

[63] Continuation of Ser. No. 101,981, Aug. 4, 1993, abandoned.

[51] Int. Cl.⁶ .................................................. G06T 15/00
[52] U.S. Cl. .................................................. 364/578
[58] Field of Search .................... 364/413.01, 413.02, 364/413.05, 413.06, 578, 401 M; 128/630, 721; 395/500

[56] References Cited

U.S. PATENT DOCUMENTS

| | | | |
|---|---|---|---|
| 4,422,081 | 12/1983 | Woods | 346/33 ME |
| 4,513,295 | 4/1985 | Jones et al. | 346/33 ME |
| 4,852,570 | 8/1989 | Levine et al. | 128/630 |
| 4,878,175 | 10/1989 | Norden-Paul et al. | 364/413.01 |
| 5,065,315 | 11/1991 | Garcia | 364/413.01 |
| 5,072,383 | 12/1991 | Brimm et al. | 364/413.02 |
| 5,075,881 | 12/1991 | Blomberg et al. | 364/578 |

(List continued on next page.)

OTHER PUBLICATIONS

S. Higgins et al., "A Graphical ICU Workstation" SCAMC 1991 Proceedings.

Jesse B. Hall, M.D., Gregory A. Schmidt, M.D., & Lawrence D. H. Wood, M.D., eds, *Principles of Critical Care*, McGraw-Hill, Inc., New York, 1992. The teachings of Chapter 41, "Computer Applications" by Alan H Morris, M.D. and Reed M. Gardner, Ph.D. at pp. 500–514.

(List continued on next page.)

*Primary Examiner*—Kevin J. Teska
*Assistant Examiner*—Matthew Loppnow
*Attorney, Agent, or Firm*—Choate, Hall & Stewart

[57] ABSTRACT

An apparatus and method for determining the course of a patient's illness and response to treatment. The system uses a matrix of coordinated, nonlinear time plots to guide diagnosis and record treatment. The preferred method comprises representing patient findings and treatments as a matrix of small graphs each comprised of a label, the numeric value of the most recent plotted value, plotted values themselves and axis markers. The graphs are coordinated so that plots in the same column share the same horizontal time axis and plots in the same row share the same vertical clinical value axis. Nonlinear scales are used to allow both recent and historical trends to be presented on the same axis and to allow various clinical values to be presented on the same axis. The system also presents a small of amount of textual information about the patient to identify and annotate the graphical presentation.

21 Claims, 8 Drawing Sheets

U.S. PATENT DOCUMENTS

| | | | |
|---|---|---|---|
| 5,077,666 | 12/1991 | Brimm et al. | 364/413.02 |
| 5,181,520 | 1/1993 | Wertheim et al. | 128/731 |
| 5,199,439 | 4/1993 | Zimmerman et al. | 364/413.02 |
| 5,208,907 | 5/1993 | Shelton et al. | 395/149 |
| 5,247,611 | 9/1993 | Norden-Paul et al. | 395/161 |
| 5,253,361 | 10/1993 | Thurman et al. | 395/600 |
| 5,253,362 | 10/1993 | Nolan et al. | 395/600 |
| 5,262,943 | 11/1993 | Thibado et al. | 364/413.01 |
| 5,301,319 | 4/1994 | Thurman et al. | 395/600 |
| 5,325,478 | 6/1994 | Shelton et al. | 395/148 |
| 5,327,341 | 7/1994 | Whalen et al. | 364/413.01 |
| 5,347,453 | 9/1994 | Maestre | 364/413.02 |
| 5,365,948 | 11/1994 | McMichael | 364/413.01 |
| 5,471,606 | 11/1995 | Huang et al. | 395/500 |

OTHER PUBLICATIONS

Carol L. Lake, M.D., *Clinical Monitoring*, W. B. Saunders Co., Philadelphia, 1990. The teachings of Chapter 12, "Patient Data Management Systems" by John W. Hoyt, M.D. and Harry Comerchero at pp. 433–451.

J. Andrew Billings, M.D. & John D. Stoeckle, M.D., *The Clinical Encounter*, Year Book Medical Publishers, Inc., Chicago, 1989. The teachings of Chapter 6, "Recording" at pp. 81–91.

Lawrence L. Weed, M.D., *Medical Records, Medical Education, and Patient Care*, The Press of Case Western Reserve University, Cleveland, 1969. The teachings of Chapter 5, "The Progress Notes" at pp. 49–60 and chapter 6, Flow Sheets at pp. 61–82.

James D. Foley, Andries van Dam, Steven K. Feiger, and John F Hughes, *Computer Graphics: Principles and Practice*, 2nd ed., Addison–Wesley Publishing Company, Inc., Reading 1992. The teachings of Chapter 2, at pp. 25–66, Chapter 3 at pp. 67–144, and Chapter 7 at pp. 285–346.

Edward R. Tufte, *Envisioning Information*, Graphics Press, Cheshire, CN, 1990. pp. 36–51 and pp. 56–57.

Doe, John  Diabetic Ketoacidosis  10.1.92  5-711

Kids had strep throats week prior to admission.

```
        -41y -m -wk  10.1      -41y -m -wk  10.1      -41y -m -wk  10.1    Sleeping better.
              Na  134                Cl  103                T  100            MIC RN 0600 10.01.92
+                                                                   +     Slept poorly
+                                                                   +        MIC RN 0600 09.30.92
                                                                          Pt vomiting.
-                                                                   -        MIC RN 1200 09.29.92
-                                                                   -     Pt admtd via ER for
                                                                             DKA. Flu sx for 5d pta
                                                                             JJW MD 1000 09.29.92
              K  3.6                 CO₂ 30                 P  92         Pt complaining of
+                                                                   +     LUQ pain
+                                                                   +        MIC RN 0800 09.29.92
-                                                                   -
-                                                                   -

BP 130/90
+                                                                   +
+                                                                   +
-                                                                   -
-                                                                   -

Glu 243
+                                                                   +
+                                                                   +
-                                                                   -
-                                                                   -

Reg Insulin 10     NPH Insulin 15       Ampicillin 1
+                                                                   +
+                                                                   +
-                                                                   -
-                                                                   -

METHOD AND APPARATUS FOR GRAPHICAL MODELING OF PSYCHIATRIC AND MEDICAL RECORDS

REFERENCE TO RELATED APPLICATIONS

This application is a continuation under 37 C.F.R. §1.53 of United States patent application Ser. No. 08/101,981 (Attorney Docket No. SMD-001), filed Aug. 4, 1993, for "METHOD AND APPARATUS FOR GRAPHICAL MODELING OF PSYCHIATRIC AND MEDICAL RECORDS", now abandoned.

REFERENCE TO APPENDICES

The disclosure of this patent document contains material which is subject to copyright and/or mask work protection. The owner thereof has no objection to facsimile reproduction by anyone of the patent document or the patent disclosure, as it appears in the U.S. Patent and Trademark Office patent file or records, but otherwise reserves all copyright and/or mask work rights whatsoever.

BACKGROUND OF THE INVENTION

This invention relates to an apparatus and methods for determining the course of a patient's illness and response to treatment. More particularly, this invention provides a mechanism for analyzing for presentation in graphical form information concerning the patient's symptoms, emotional state, physical findings, test results and treatments. The invention has application in the fields of medicine, psychiatry, surgery, obstetrics, pediatrics, and other medical specialties.

In general, written records for medical and for psychiatric patients have been used to record symptoms as they are reported, physical findings as they are observed, test results as they are measured and treatments as they are instituted. Early medical record systems relied solely on paper documentation. Typically, medical personnel recorded observations or treatments by hand on preprinted forms for storage on clipboards, in binders or in folders. Certain reports, such as lab write-ups, may have been recorded in typewritten form. More recently, medical records have been stored in computer databases for on-line access and display in text format and, to a limited degree, graphical format.

In this regard, reference may be made to the book by Jesse B. Hall, M.D., Gregory A. Schmidt, M.D., & Lawrence D. H. Wood, M.D., eds, *Principles of Critical Care*, McGraw-Hill, Inc, New York, 1992. The teachings of Chapter 41, "Computer Applications" by Alan H Morris, M.D. and Reed M.Gardner, Ph.D. at pages 500–514 are incorporated herein by reference. Reference may be made to the book by Carol L. Lake, M.D., *Clinical Monitoring*, W. B. Saunders Co., Philadelphia, 1990. The teachings of Chapter 12, "Patient Data Management Systems" by John W. Hoyt, M.D. and Harry Comerchero at pages 433–451 are incorporated herein by reference. Reference may be made to the book by J. Andrew Billings, M.D. & John D. Stoeckle, M.D., *The Clinical Encounter*, Year Book Medical Publishers, Inc. Chicago, 1989. The teachings of Chapter 6, "Recording" at pages 81–91 are incorporated herein by reference. Reference may be made to the book by Lawrence L. Weed, M.D., *Medical Records, Medical Education, and Patient Care*, The Press of Case Western Reserve University, Cleveland, 1969. The teachings of Chapter 5, "The Progress Notes" at pages 49–60 and chapter 6, "Flow Sheets" at pages 61–82 are incorporated herein by reference.

Reference may also be made to the book by James D. Foley, Andries van Dam, Steven K. Feiger, and John F Hughes, *Computer Graphics: Principles and Practice*, 2nd ed., Addison-Wesley Publishing Company, Inc., Reading 1992. The teachings of Chapter 2, at pages 25–66, Chapter 3 at pages 67–144, and chapter 7 at pages 285–346 are incorporated herein by reference.

In conventional medical and psychiatric record systems, information is usually presented in one of a small number of forms: prose, flowsheet, time plot. Hand written prose is the form most often used to record and present patient information. Sometimes word processing or automated data processing techniques are used to make the text more legible and accessible.

Patient information that is largely numeric is sometimes presented in flowsheets, also referred to as spreadsheets by some. Each flowsheet column corresponds to succeeding dates or times. Each flowsheet row is reserved to present a certain type of data such as temperature or blood pressure or fluids given. Alternatively, rows may be used for times and columns for types of data.

Sometimes automated data processing techniques are used to make the values easier to enter and more legible. Conventional time plots (graphs) are occasionally used in permanent patient records to present the results of a specific laboratory test over the course of an illness. The test value is plotted along a linear vertical scale and time is plotted along a linear horizontal scale. Such plots are more commonly used for instantaneous display of electrocardiograms and blood pressure for patients in an intensive care unit, in an operating room, or in a recovery room. These plots show a small number of critical values for a short period of time on a linear scale and are not usually part of the permanent record.

A problem presented by these prior art systems is that the presentation of patient information in prose form makes it difficult to apprehend the course of a patient's disease, or the course of a patient's treatment. Hand written prose is often difficult to read. Typing may improve legibility, but it does not organize the information so that the human eye may perceive a pattern. Rather, prose presentation requires the eye and the mind to work continuously to pick and sort out patterns of disease and treatment from text ordered only by the time it happened to be recorded.

Further, because a long list of numbers only draws the eye and the mind along in a straight line, the prior art systems using the flowsheet form also make it difficult to apprehend the course of patient's disease, or the course of patient's treatment. Moreover, the numbers themselves are surrounded by other numbers. The upward or downward trend, the value to value variability is not directly perceived.

Presenting patient information in conventional time plots makes it difficult to apprehend the patient's overall condition. Conventional time plots do make it possible for the eye to follow the trends and variations of a given type of information. However, prior methods only present one or a small number of plots to be viewed together and linear scaling makes it difficult to perceive the trends over the last few days in the same glance as the trends over the years of the patient's life.

An object of this invention, accordingly, is to provide improved methods and apparatus for analysis and presentation of patient information which remedies the above mentioned drawbacks. More particularly, and object of the invention is to provide a mechanism for analyzing for presentation in graphical form patient information so that it can be quickly and accurately perceived by physicians, nurses, and other medical personnel.

A further object of this invention is to provide such a mechanism which can operate on a wide variety of patient information including, but not limited to, physical findings, psychiatric findings, laboratory test results, and various treatments.

Yet another object of this invention is to provide methods and apparatus for analyzing for presentation in graphical format patient information that encompasses long periods of time so that chronic disease conditions and the results of treatments can be quickly and accurately perceived.

Still another object of this invention is to provide such methods and apparatus that can serve as components of an on-line patient information system.

A still further object of this invention is to provide for the analysis and presentation of patient information in graphical form and, thereby, to facilitate the exchange of medical information around the world by minimizing language differences.

SUMMARY OF THE INVENTION

The aforementioned and other objects are attained by the invention, which provides in one aspect an apparatus for graphical modeling of medical or psychiatric histories. The apparatus includes an element for inputting one or more medical/psychiatric clinical data points to be modeled. Each history signal has a quantitative value representing, e.g., a laboratory result, and a temporal value representing, e.g., time of measurement.

A temporal scaling element generates, from the original temporal value in each history signal, a "modified" temporal value. Each modified value represents a time-wise location of the respective original temporal value in an epoch in which that value belongs. These epochs are associated with time periods of medical/psychiatric significance, such as, current day, past week, past month, lifetime prior to last month. Thus, each epoch has a duration and a time-wise distance from the present which decreases with successive epochs.

A gross-quantitative scaling element generates, from the original quantitative value in each history signal, a modified quantitative value. These modified values indicate the gross-quantitative range in which the original quantitative value falls, for example, clinically normal, abnormally elevated, markedly elevated, abnormally reduced, and markedly reduced.

A modeling element generates an output signal that represents graphically the modified quantitative values of each history signal as a function of its respective modified temporal values.

According to a further aspect of the invention, the apparatus can include a display element that generates a graphical plot based on the output signal, that is, it plots the modified quantitative values as a function of their respective modified temporal values. While the epochs can be plotted to span like distances on said plot, according to a further aspect of the invention selected epochs span greater distances for emphasis.

In still another aspect, the apparatus can plot, in vertical alignment, the output signals associated with plural sets of history signals.

In still other aspects, the invention provides a method for operation of an apparatus of the type described above.

These and other aspects of the invention are evident in the drawings and in the description which follows.

BRIEF DESCRIPTION OF THE DRAWINGS

A further understanding of the invention may be attained by reference to the attached drawings, in which:

FIG. 7 depicts an exemplary medical record model generated by an apparatus operating in accord with a preferred practice of the invention.

DETAILED DESCRIPTION OF THE ILLUSTRATED EMBODIMENT

Figure 1A:
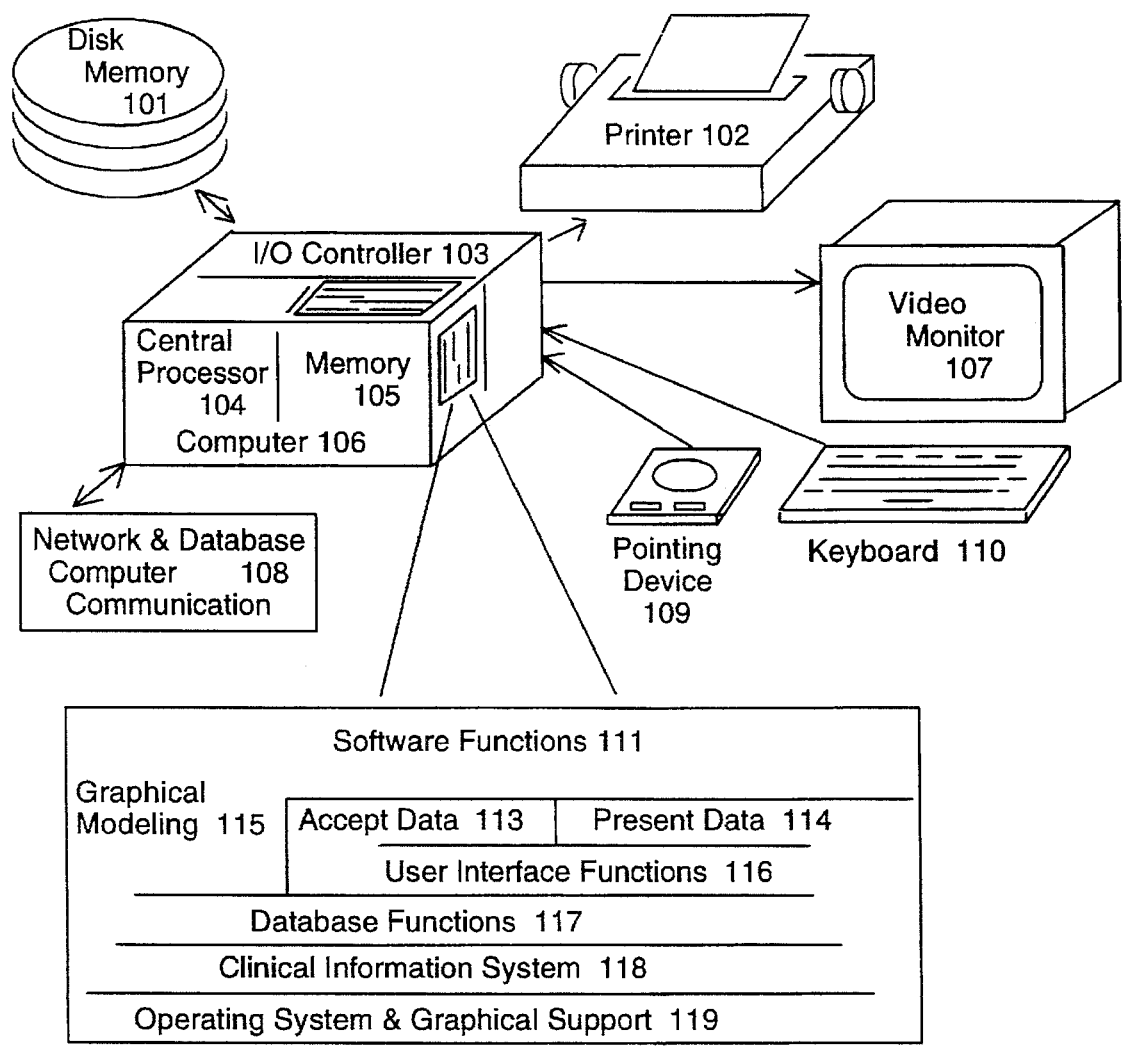
FIG. 1A depicts a computer system for use in connection with a preferred practice of the invention.

FIG. 1A illustrates a computer system of the type used in connection with practice of the invention. Computer 106 is connected to data processing peripheral units comprising a disk memory 101, a computer communications network 108, a video monitor 107, a keyboard 110, and a pointing device 109. The disk memory 101 serves as a non-volatile storage element for information accessed by the computer 106. The computer communications network 108 serves to allow access to non-volatile storage elements and databases or other peripheral devices among a collection of computers. The monitor 107, the keyboard 110, and the pointing device 109 provide an interface between the computer 106 and the user. Specifically, the monitor 107 presents a graphic display of signals generated by the computer 106, while the keyboard 110 and pointing device 109 convert typed messages and position signals into computer-readable form.

The illustrated computer 106 includes functional units comprising an i/o controller 103, a central processor 104, and a (random access) memory unit 105. The i/o controller 103 is an interface between the computer 106 and its peripheral units. The central processor 104 serves as the primary source of control, arithmetic, and logic operations within the computer 106. Further, the memory unit 105 provides volatile, rapid-access storage for the computer 106, particularly for the central processing unit 104.

The illustrated hardware used for practice of the invention can be selected from any one of many commercially available programmable digital computers, e.g., preferably, a commercially available Macintosh II, running the version 6.0.5 operating system, operating in accord with the teachings below.

Figure 1B:
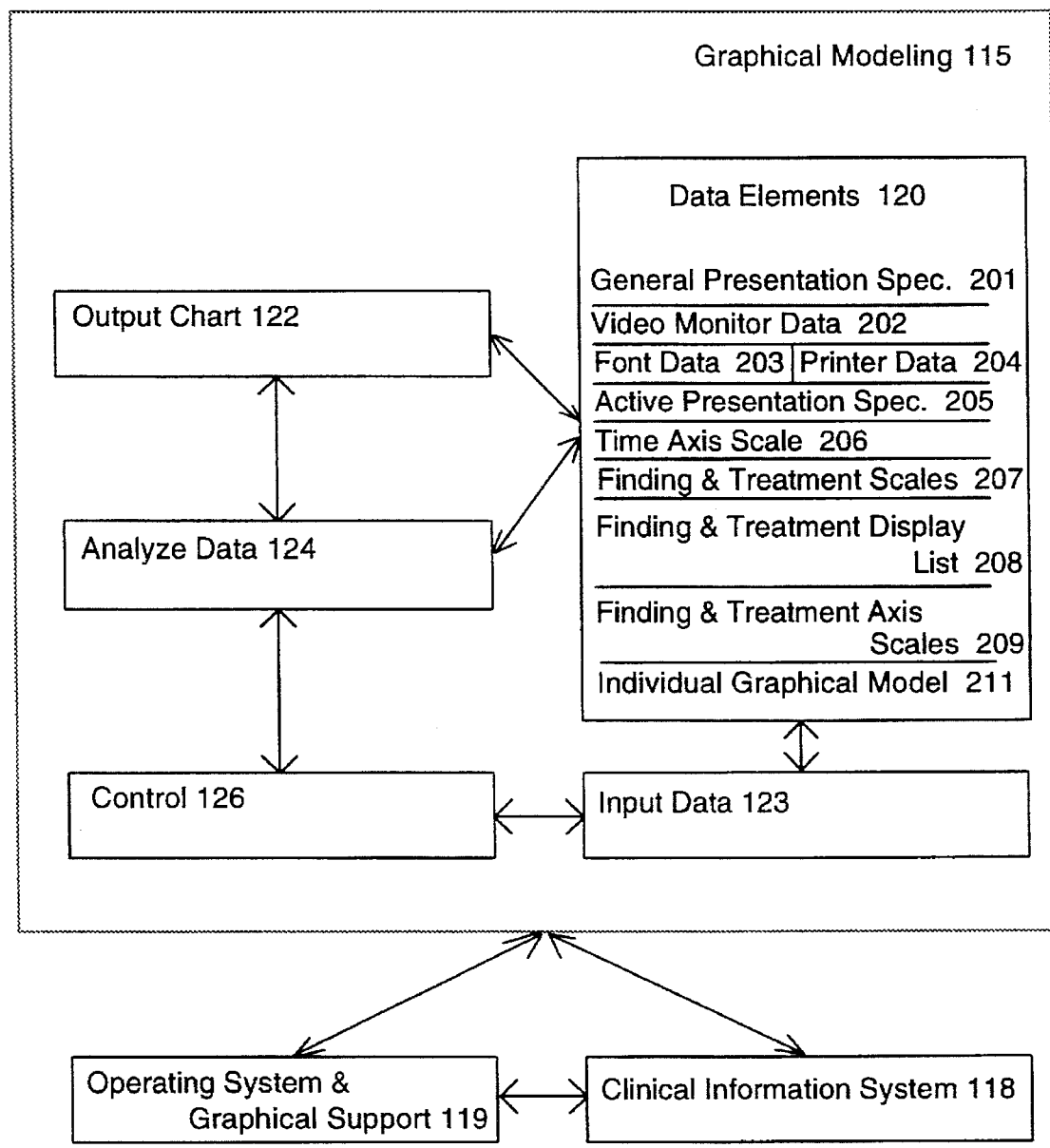
FIG. 1B depicts a preferred medical or psychiatric record charting system according to the invention.

FIG. 1B depicts a preferred medical record graphical modeling system 115 according to the invention. The system 115 includes an element 126 that controls the obtaining and analysis of data, as well as the charting of the analyzed data. Input data 123, about an individual patient, is obtained from the clinical information system 118. In the course of obtaining that data, the operating system and graphical support 119 may be activated directly by controller 126 as well as indirectly by the clinical information system 118. Those skilled in the art will appreciate that input data 123 is not necessarily all obtained at once. Rather, as the apparatus operates to analyze data 124 concerning details of past patient history, or as the apparatus operates to form the output chart 122 based on details of past patient data, the control 126 can activate the clinical information system 118 and the operating system & graphical support 119 as needed to fill-in input data 123.

Input data 123 directly affecting the size and detailed form of the output chart 122 is kept in the data store 120 once obtained through the operating system and graphical support 119 or the clinical information system 118 by the control 126. Like the input data 123, the general presentation specification, video monitor data, font data, and printer data 201–204 are not necessarily all obtained at once; rather that data can be obtained during the process and used as described below.

Figure 2:
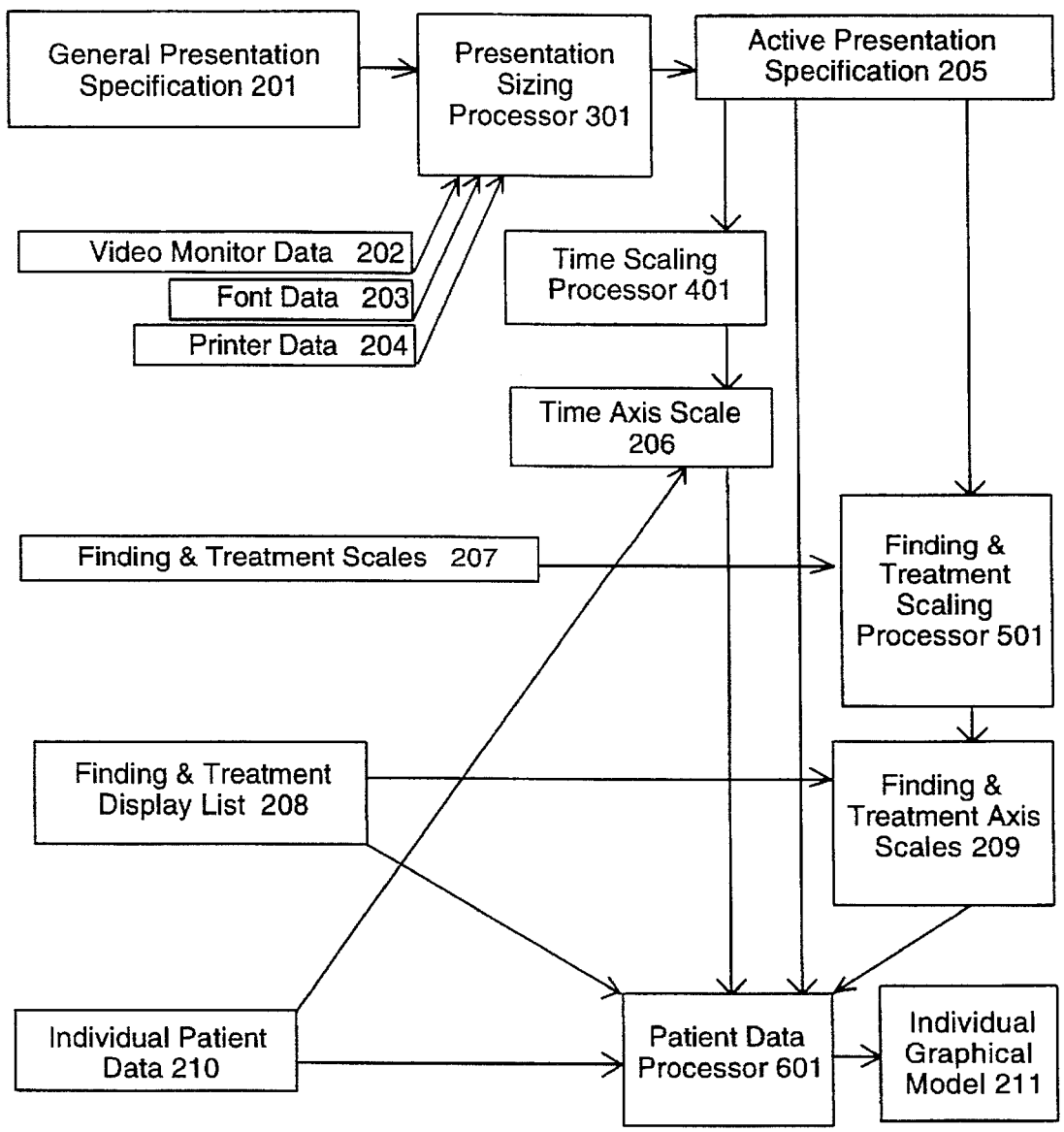
FIG. 2 depicts the overall data flow within a system embodying the invention.

FIG. 2 depicts a functional interrelationship between elements of a preferred embodiment of the invention, as well as the processing of data by those elements. The general presentation specification, the video monitor data, the font data, and the printer data, 201–204, are presented as inputs to the presentation sizing processor 301. The output of the presentation sizing processor 301, is the active presentation specification 205. The active presentation specification serves as input to the time scaling processor 401, as input to the finding and treatment scaling processor 501, and as input to the patient data processor 601. The active presentation specification encodes information about the exact sizes and placements for the graphical and textual elements of the patient model, e.g., position, font, and size of the text of the patient's name, position, and size of the individual graphs in the matrix, etc.

Those skilled in the art will appreciate that the designated general presentation specification 201 need not be implemented as an independent entity. Indeed in a preferred implementation, specification 201 is defined by way of constants. Likewise, 205 is preferably implemented as a collection of variables and procedural information specifying, for example, that the date text is positioned by subtracting its display width from position of the room number text.

Referring, again, to the drawing, the time scaling processor 401 uses information about the size of the individual graphs, the fonts for axis labels, the position of the graphical matrix from the active presentation specification 205, the date of birth, and times that findings or treatments were recorded to produce a time axis scale 206, as discussed in further detail below. The resultant time axis scale 206 comprises a mapping from the date and time to display coordinates, a series of labels, and an optional series of tick marks.

The finding and treatment scaling processor 501 uses information about the size of the individual graphs, the fonts for axis labels, and the position of the graphical matrix from the active presentation specification 205. It also uses information about finding and treatment scales 207 such as normal value range, elevated value range, etc. to produce finding and treatment axis scales 209 for each finding or treatment included in the finding and treatment display list 208. A finding and treatment axis scale comprises a mapping from values to display coordinates, a series of labels, and an optional series of tick marks.

The patient data processor 601, uses the individual patient data 210, to fill in the elements encoded in the active presentation specification 205. The individual finding and treatment values are mapped into the graphs within the matrix using the mapping information encoded in the axis scales 206 and 209. The text log entries are fit into the column encoded in the active presentation. The result is an encoding of the individual graphical model 211, which can easily be output onto the display using the graphical support functions of the operating system 119 as is customary in the art.

Figure 3:
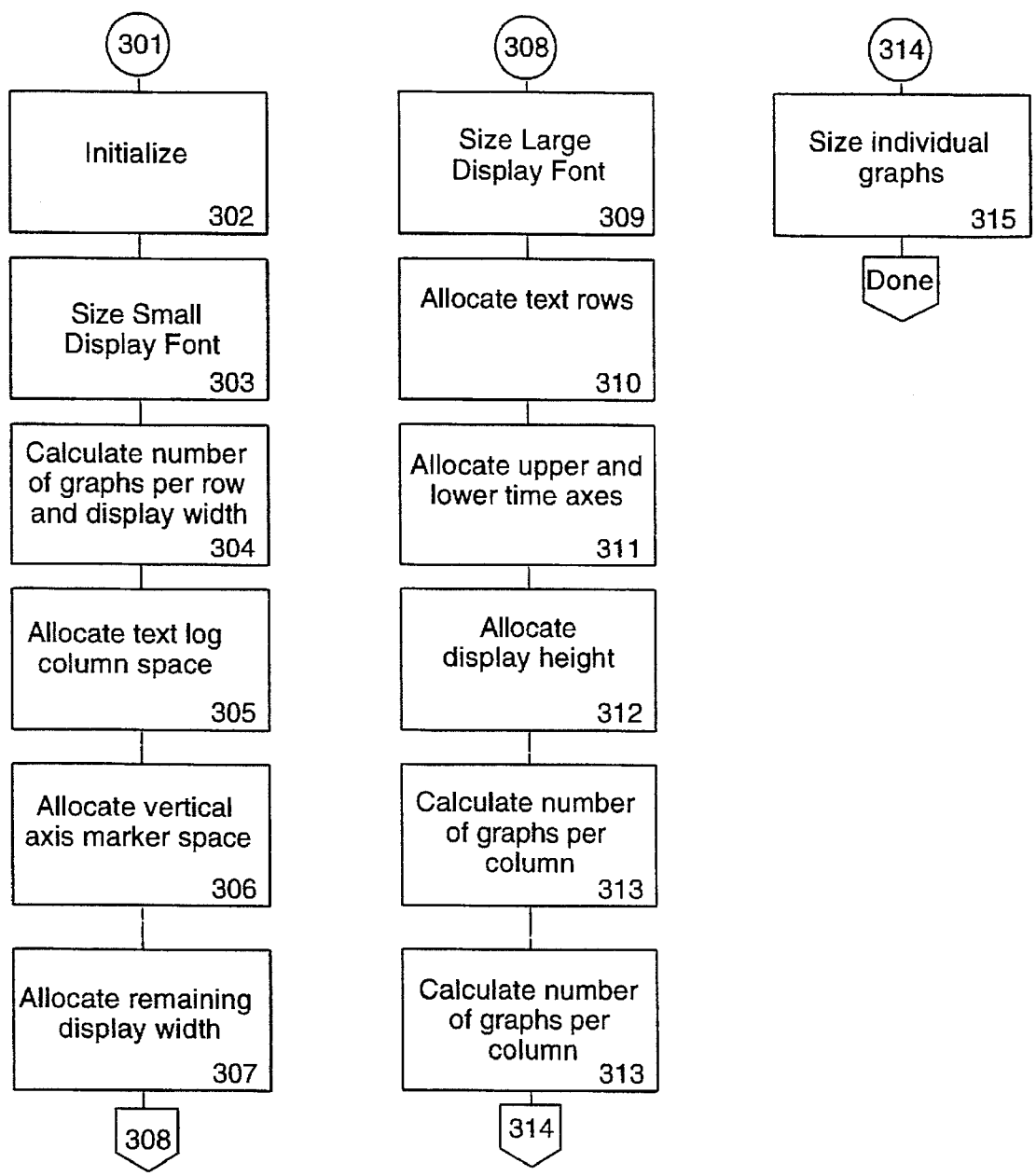
FIG. 3 is a flow chart depicting a processing sequence to produce the output of the presentation sizing processor.

FIG. 3 is a flow chart depicting a preferred processing sequence to produce the output of the presentation sizing processor. The illustrated process begins at initialization phase 302. The extent of initialization is determined by the particular environment in which the invention is practiced. By way of example, this step may entail setting program variables, and particularly, counters and graphical position pointers and character font tables. Additionally, input/output processes, e.g., data file accessing routines may require initialization prior to sizing, etc.

Following initialization, steps 303–307 control the horizontal dimensions of the display elements. In step 303, the process accepts signals indicating the type of printer 102 or monitor 107 to be used for display of the finished graphical model. Stored font data 203 and additional font data available from the operating system 119 is used to determine the size of the preferred character font for small text display such as axis labels. The small text font is used later to label the horizontal axis which is a critical factor in determining the number of graphs that may be easily viewed in one row, step 304. Step 304 also takes into account the relative size of the text log. Step 305 allocates the exact amount of display space for the text log based on the results of step 304. Step 306 allocates space for the vertical axis labels taking into account the shape of the labels and the results of the preceding steps. Step 307 allocates any remaining display width to avoid uneven horizontal display element spacing.

With continued reference to FIG. 3, steps 309–314 control the vertical dimensions of the display elements. Step 309 proceeds in a fashion similar to step 303 to determine the size of the preferred character font for large text display such as the patient's name. Step 310 allocates space for lines of large text font text at the top. The position of the upper and lower time axes is then determined in step 311. The display height for the columns of graphs is then allocated in step 312. Step 313 determines the number of graphs that may be viewed in one column.

Still referring to FIG. 3, step 315, produces the display size of an individual graph based on the column and row information produced in the preceding steps. The critical components of sizing information produced in steps 303–315 are encoded into the active presentation specification 205.

Figure 4:
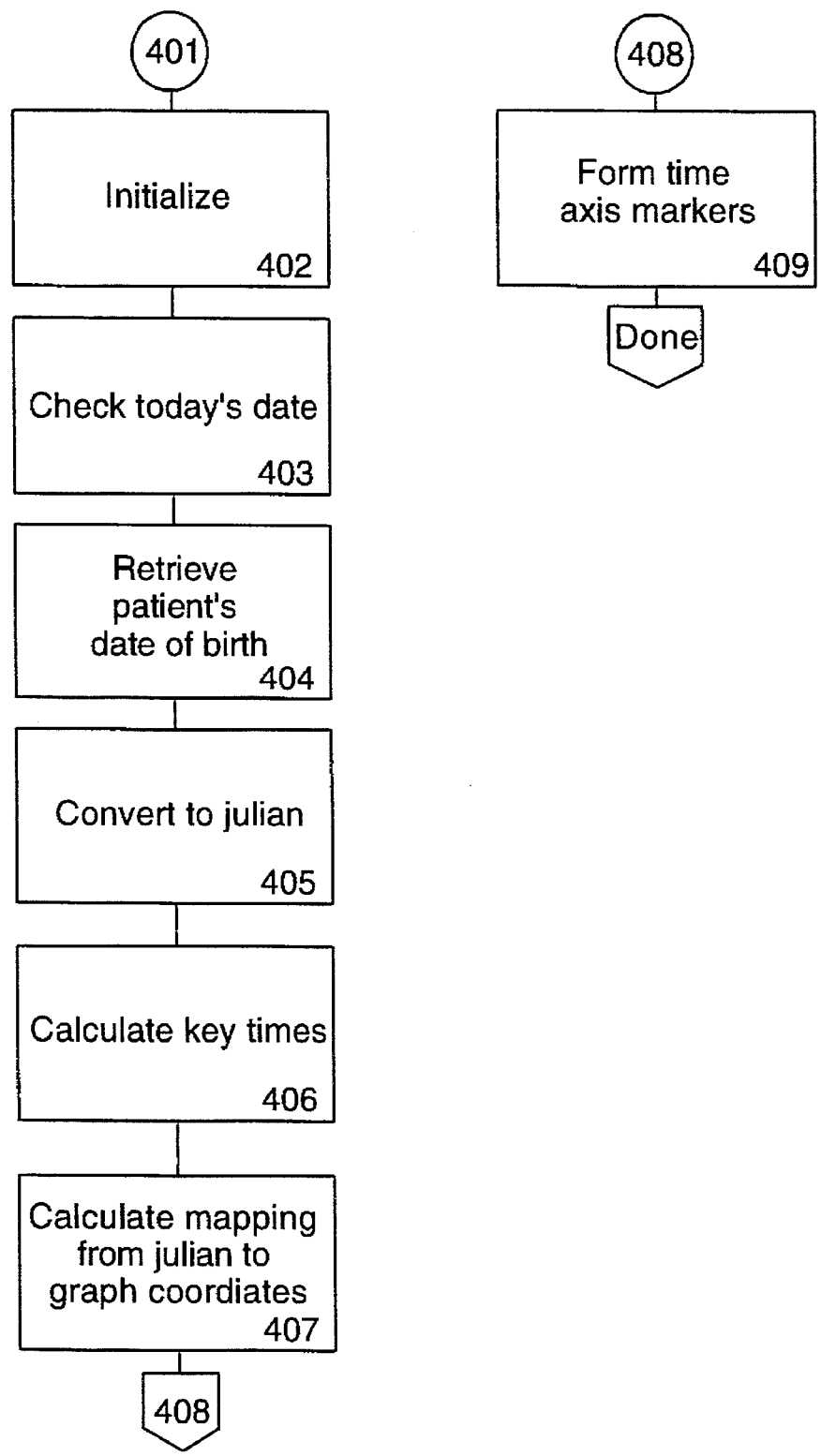
FIG. 4 is a flow chart depicting a processing sequence to produce the output of the time scaling processor.

FIG. 4 is a flow chart depicting a preferred processing sequence to produce the output of the time scaling processor. The illustrated process begins at initialization phase 402. As with step 302, the extent of initialization is determined by the particular environment in which the invention is practiced.

The current date is determined in step 403 from data available from the operating system 119. The end of the current day is normally used as the upper limit of the time period displayed.

The date of the patient's birth is determined in step 404 from the clinical information system 118, using appropriate database functions 117. The patient's birth is normally used as the lower limit of the time period displayed.

Alternative time periods of interest may be determined by processing information from the clinical information system. Depending on the patient's age, history of hospitalizations and testing, diagnosis, and other clinical considerations various other periods of interest may be used in the succeeding steps.

With continued reference to FIG. 4, step 405 converts the dates to julian format in a manner which to allows time of day to be included along with date. Key times of interest are calculated in step 406. Key times are those important for labeling the time axis or mapping to graph coordinates. These are typically the date a week ago, a month ago, etc. The results of the previous steps are used in step 407 to produce a mapping, typically a piece-wise linear mapping, from julian date and time to graph coordinates. Time axis labels are produced in step 409. The mapping from step 407 and the labels from step 409 along with the individual graph sizing from the active presentation specification 205, are combined to form the time axis scale 206.

Figure 5:
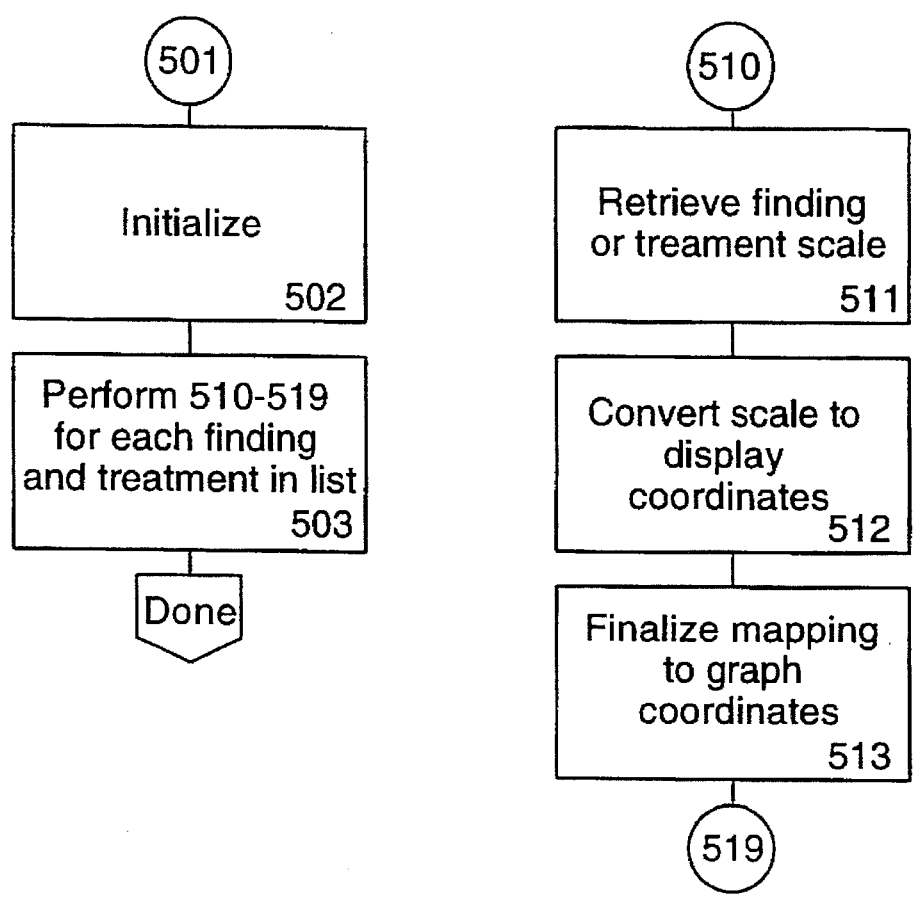
FIG. 5 is a flow chart depicting a processing sequence to produce the output of the finding & treatment scaling processor.

FIG. 5 is a flow chart depicting a processing sequence to produce the output of the finding and treatment scaling processor. The illustrated process begins at initialization phase 502. As with step 302, the extent of initialization is determined by the particular environment in which the invention is practiced.

Step 503 takes as an input the finding and treatment display list 208. It uses this list to control the repetition of the remaining steps 510–519. Step 503 performs one iteration for each of the findings or treatments to appear in the final display. An equivalent implementation would repeat the remaining steps for all the possibilities among the finding and treatment scales 207. The output of the iterations are the finding and treatment axis scales 209. As with the time axis scale 206, a finding and treatment axis scale encodes the mapping from values as recorded for a patient to graph coordinates suitable for display.

With continued reference to FIG. 5, the iterated step 511 retrieves a finding and treatment scale from among the scales 207. Using information from the active presentation specification 205, step 512 converts the scale retrieved into display coordinates. Then step 513 finalizes the mapping to correspond to the position of the individual graph within the display.

Figure 6:
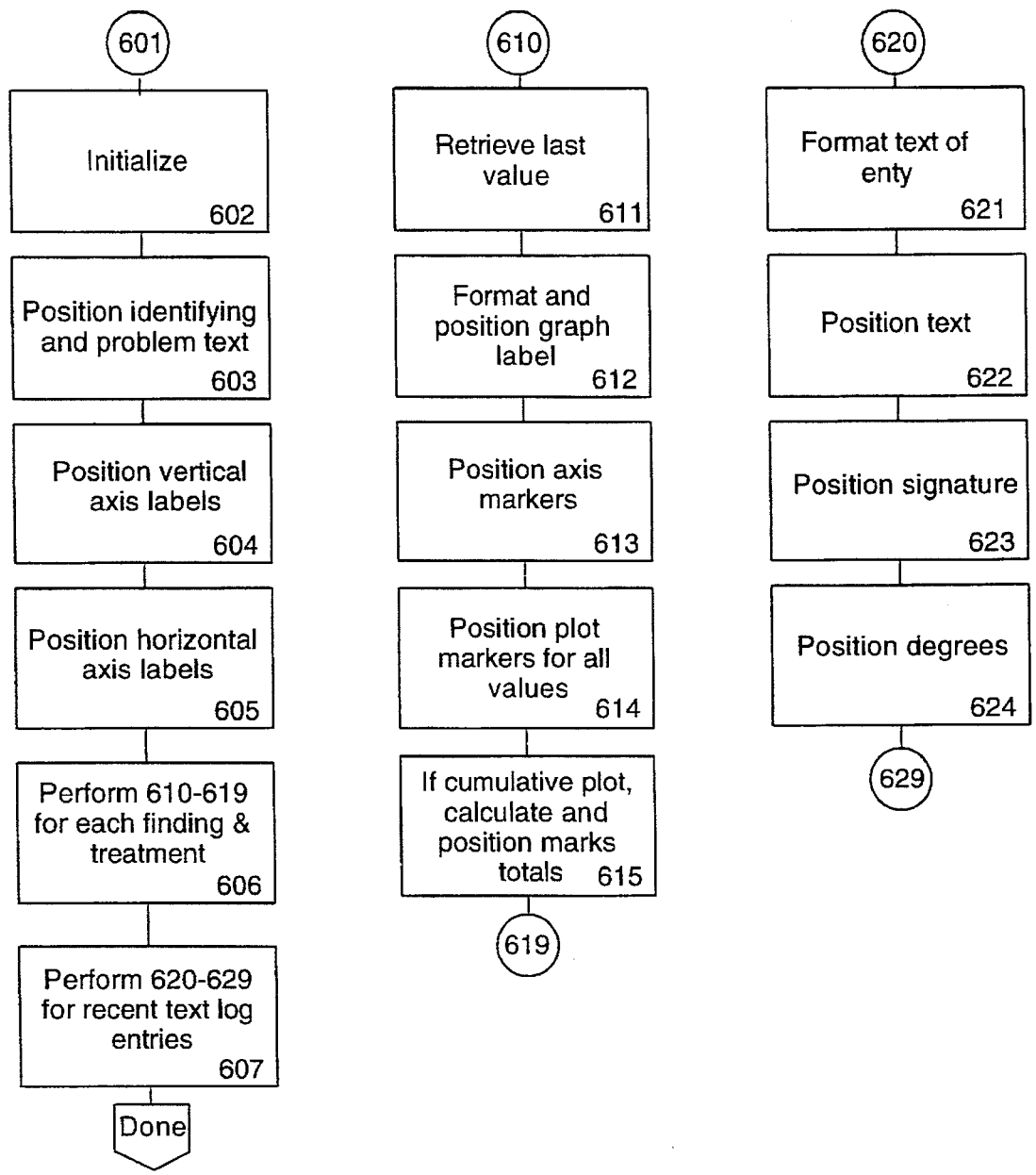
FIG. 6 is a flow chart depicting a processing sequence to produce the output of the patient data processor.

FIG. 6 is a flow chart depicting a processing sequence to produce the output of the patient data processor 601. The illustrated process begins at initialization phase 602. As with step 302, the extent of initialization is determined by the particular environment in which the invention is practiced, especially with respect to individual patient data 210 retrieval through the database functions 117 of the clinical information system 118. Throughout the steps illustrated in FIG. 6 and described below, it should be assumed, unless otherwise stated, that the individual patient data 210 is retrieved through the database functions 117 of the clinical information system 118.

After initialization, step 603 positions the patient identifying information and clinical problem text in the graphical model 211 based on the active presentation specification 205. Text font, size, and style are processed from the active presentation specification along with the display position itself.

With continued reference to FIG. 6, step 604 positions the vertical axis labels for each row. Then step 605 positions the horizontal time axis labels for each column. This puts the display framework into place for the matrix of small graphs.

Step 606 causes each small graph to be constructed and positioned in the graphical model 211. It does this by iterating steps 610–619 for each of the findings and treatment in the finding and treatment display list 208.

Step 607 causes the text log to be constructed and positioned in the graphical model 211. It does this by iterating steps 620–629 for each of the text log entries. The iteration proceeds from most recent to earliest (or earliest to most recent) depending upon the active presentation specification 205. Also based upon the active presentation specification, a subset of entries are positioned in the graphical model (the entire set of entries may exceed the display space allocated). The iteration of steps 620–629 may be terminated based on text position calculation performed in step 622.

After the processing in step 607 is finished, the graphical model 211 is complete except for the positioning of a control button if the model is to be used as part of a user interface function 116. Depending upon the operating system and graphical support 119 available in the particular environment in which the invention is practiced, the control button may be added to the model or positioned implicitly by the operation of the graphical support 119.

Steps 610–619 operate under the control of step 606 to produce and position one small graph for a finding or a treatment according to the active presentation specification 205, the time axis scale 206, and the appropriate finding or treatment axis scale 209. Step 611 retrieves the most recently recorded value for the patient finding or treatment. Step 612 formats and positions the label for the graph and includes the most recent value for placement in the graphical model 211. Step 613 positions the axis markers for the graph in the graphical model based on the active presentation specification 205 so that the designated points in the time axis scale 206 and the appropriate finding or treatment axis scale 209 will be visually evident. Step 614 retrieves all the available patient values and positions markers in the graphical model according to the mappings of the designated points in the time axis scale 206 and the appropriate finding or treatment axis scale 209. In the case of double valued findings, such as the systolic and diastolic values of a blood pressure, two or more markers may be positioned. In the case of findings or treatments whose daily cumulative value is designated to appear in the graphical model by the finding and treatment scales 207, cumulative values are computed and line segments or markers appropriately positioned in the graphical model.

Steps 620–629 operate under the control of step 607 to produce and position one text entry according to the active presentation specification 205. Step 621 retrieves and formats the text one entry. Text formatting includes, but is not limited to, word wrapping of lines too long for the column display width allocated and hanging indents to make individual entries visually apparent. Step 622 positions the formatted text in the graphical model 211. Step 623 retrieves the signature information associated with the text entry and positions the signature or initials in the graphical model. Step 624 retrieves the degrees, M.D. or R.N. or M.S.W., etc., associated with the signature and positions the designation in the graphical model.

FIG. 7 illustrates an exemplary individual graphical model 211 generated by the system described above after the output chart step 122 to a printer 102, via graphical support software and related operating system calls 119 as customary in the art of graphical display. Particularly, the model reveals the input data 123 (laboratory results, vital signs, and medications) retrieved from a clinical information system 118 for a patient presented as a coherent matrix of plots with labels and text information in a form readily understood by physicians and their staff.

FIG. 7 specifically illustrates a graphical model output for a prototypical patient, Mr John Doe, suffering from diabetic ketoacidosis the week after his children were sick with sore throats. He was admitted 9.29.92, two days prior to the day the graphical model was output, 10.1.92. The plots show that his serum sodium (NA) was decreased, but returning to normal (last value 134), his serum glucose (Glu) was elevated (last value 243), and that he was treated with two types of insulin (Reg and NPH, last doses 10 and 15 respectively). Other information also appears on the plots. Text notes indicate that he was complaining of pain, but was sleeping better by 10.1.92.

The size and relative proportions of the plots and text in FIG. 7 are governed by the active presentation specification 205 which is input to the patient data processor 601 as it creates the individual graphical model 211. The plots are large enough to convey trends over time, yet small enough so that a number of them fit on a page with room for a legible titles including the most recent numeric values. The text at the top is made large enough to quickly identify the patient, primary problem (diagnosis), date of output, room number, and other brief clinical information. The text column on the side presents brief notes in reverse chronological order so that the most recent note is at the top.

The active presentation specification 205 also governs the size and placement of the plot axes. The horizontal time axis labels appear immediately under the two lines of text at the top of FIG. 7 and are repeated at the bottom of FIG. 7. The actual time axis scale 206 and labels are governed by the output of the time scaling processor 206. The left most label "–41 y" indicates that based on the input data 123 the earliest possible information would be from the patient's birth 41 years before the date of output. "–m" indicates one month prior. "–wk" indicates one week prior. "10.1" is the short form of "10.1.92" the day of output. The horizontal dots on each plot delineate the corresponding time periods.

The vertical axis labels appear on the left of FIG. 7 and are repeated on the right of the plots, just left of the text column. The finding and treatment scaling processor 501 outputs finding and treatment axis scales 209 so that the various laboratory values, vital signs, and treatments can use the same axis labels. The large "+" indicates extremely elevated values, the small "+" indicates moderately elevated values, the unlabeled central region corresponds to normal values, the small "–" indicates moderately decreased values, and the large "–" indicates extremely decreased values. The vertical column of dots on the plots delineate the vertical regions. The vertical column's horizontal position also delineates the beginning of the day of output.

The small crosses on the plots indicate individual patient values. The original temporal value of each finding or treatment is scaled by the patient data processor 601 along with the original quantitative value based on the time axis scale 206 and the finding and treatment axis scales 209 respectively. The scaling determines the position of the cross for each patient value on the plot. Treatments with cumulative effects are totaled for each day and a line segment positioned by the same scaling used for individual values.

A further understanding of a preferred practice of the invention may be attained by reference to the software listings provided in the Appendix hereto. Those listings are in the Common Lisp programming language making use of the Common Lisp Object System (CLOS) and the Common Lisp Interface Manager (CLIM) operating under the Macintosh Operating System version 6.0.5. Those skilled in the art will appreciate that certain routines referred to in the Appendix, such as "run," "clim-shared," and "print-u," serve to initialize the running environment in a manner conventional to the art.

The foregoing describes a preferred apparatus and method for graphical modeling of a medical or psychiatric histories achieving the objects set forth above. Those skilled in the art will, of course, appreciate that the illustrated embodiment is exemplary only and that other embodiments incorporating modifications thereto fall within the scope of the invention, of which

APPENDIX to

United States Patent and Trademark Office

Patent Application for

METHOD AND APPARATUS FOR GRAPHICAL
MODELING OF PSYCHIATRIC AND MEDICAL RECORDS

© 1993 Seth M. Powsner

Appendix Page 1

```
;;; -*- Mode: LISP; Syntax: Common-lisp; Package: MY-APP; Base: 10; Lowercase: Yes -*-
;;: load-all.lisp SMP
;;; May be loaded by run.lisp
;;;
;;; 930118 SMP added display-text & text-fix
;;; 921220 SMP removed axis-marking.lisp (not used)
;;; 921217 SMP drawable added
;;; 921216 SMP added load of print-u (in-package #.(package-name *package*)) ; hack to suppress Lucid warnings (defparameter *src-files* '(    "global-defs"
                    "numerics"
                #+:CLIM "clim-config"
                #+:CLIM "clim-shared"
                #+:CLIM "graph-utils"
                    "display-basics"
                    "text-fix"
                    "display-text"
                    "drawable"
                    "print-u"
                    "chart-data"
                    "text-items"
                    "time"
                    "axis"
                    "text-log"
                    "plot"
                    "clinical-page"
                    "main"
                ))
(dolist (file *src-files*)
 (let ((*load-verbose* t) (name (merge-pathnames *src-dir* file)) )
  (when (boundp '*compile-app*)
    (compile-file name))
  (load name)))
;;;end of load-all.lisp ;;; global-defs.lisp 921023 SMP
;;;
;;; 930425 SMP std-time-axis flag moved here
;;; 921217 SMP elminated default-background & foreground (in-package #.(package-name *package*)) ;hack to supress Lucid warnings
```

Appendix Page 2

```
(defvar *window* '() "Pane/Window/Stream corresponding to *application-frame*")

(defvar *gchart-application-frame* '() "Our application frame")

(defvar simpler-time-axis T) ;for testing time-axis mods (defmacro defclass+ (c sc slots &rest o)
  (let ((r '()))
    (dolist (s slots `(defclass ,c ,sc ,(nreverse r) ,@o))
      (push (if (eq (second s) :accessible)
                (let ((name (first s)) (options (cddr s)))
                  `( ,name :accessor ,name
                           :initarg ,(read-from-string
                                       (concatenate 'string ":" (string name)))
                           ,@options) )
                s)
            r)
      )))
(defun elt-safe (sequence index &optional default-value)
  (if (and (<= 0 index) (< index (length sequence)))
      (elt sequence index)
      default-value
      ))
(defmacro with-accessors+ (ac obj &body b)
  (let ((r '()))
    (dolist (a ac `(with-accessors ,(nreverse r) ,obj ,@b))
      (push (if (symbolp a)
                (list a a)
                a)
            r)
      )))
;;; end of global-defs.lisp ;;; -*- Mode: LISP; Syntax: Common-lisp; Package: MY-APP; Base: 10; Lowercase: Yes -*-
;;; numerics.lisp 920531 SMP (in-package #.(package-name *package*)) ;hack to supress Lucid warnings (defun fraction (numerator denominator whole)
  (declare (integer numerator denominator whole))
  (cciling (* whole numerator) denominator)
  )
;;; end of numerics.lisp
```

Appendix Page 3

```lisp
;;; -*- Mode: LISP; Syntax: Common-lisp; Package: MY-APP; Base: 10; Lowercase: Yes -*-
;;; graph-utils.lisp 921221 SMP
(in-package #.(package-name *package*)) ; hack to suppress Lucid warnings

#-CLIM
(defclass standard-point ()
  ((x :accessor point-x :initarg :x :type number)
   (y :accessor point-y :initarg :y :type number)
   )
  (:documentation "X Y pair")
  )
#-CLIM
(defun make-point (x y)
  (make-instance 'standard-point :x x :y y)
  )
#-CLIM
(defun point-position* (p)
  (values (point-x p) (point-y p))
  )
(defmacro emptyp (seq)
  `(not (some #'type-of ,seq))
  )
(defclass+ mapping ()
  ((ordered-values :accessible :initform #() :type sequence)
   (empty-map-value :reader empty-map-value :initform 0 :type number
                    :allocation :class)
   )
  (:documentation "Piecewise linear mapping")
  )
(defun mapping-coercion (thing)
  (when thing
    (typecase thing
      (mapping thing)
      (otherwise (mapping thing))
      )))
(defun make-mapping (point-seq)
  (make-instance
   'mapping
   :ordered-values
   (sort
    (map
     'vector
     #'(lambda (p)
         (typecase p
```

Appendix Page 4

```
        (sequence (make-point (first p) (second p)))
        (standard-point p)
        (t (error
            "~&Some of input to make-mapping not a point: ~A~%"
            p))))
    point-seq) #'> :key #'point-x)
  )
)
(defun linear-interpolate (x ax ay bx by)
  (declare (number x ax ay bx by dx by))
  (let ((dx (- bx ax))
        (dy (- by ay))
        (d  (- x  ax)) )
    (if (> (abs dx) (abs d) 0.0)
        (+ (/ (* d dy) dx) ay)
        (if (= d 0.0)
            ay
            by) ) )
)
(defmethod map-value ((a-mapping mapping) a-value)
  (declare (number a-value))
  (with-accessors+ (ordered-values empty-map-value) a-mapping
    (let ((p (position a-value ordered-values :test #'>= :key #'point-x)))
      (cond ((null p) (if (emptyp ordered-values)
                          0
                          (point-y (elt ordered-values (- (length ordered-values) 1)))))
            ((= 0 p) (point-y (elt ordered-values empty-map-value)))
            ( t    (let ((a (elt ordered-values p))
                         (b (elt ordered-values (- p 1))) )
                     (linear-interpolate a-value (point-x a) (point-y a)
                                                 (point-x b) (point-y b) )
            )) ) ) )
(defmethod map-point ((x-mapping mapping) (y-mapping mapping) a-point)
  (make-point (map-value x-mapping (point-x a-point))
              (map-value y-mapping (point-y a-point))
              ) )
(defmethod inv-map-value ((a-mapping mapping) a-value)
  (declare (number a-value))
  (with-accessors+ (ordered-values empty-map-value) a-mapping
    (let ((len (length ordered-values)))
      (cond ((<= len 0) empty-map-value)
            ((= len 1) (point-x (elt ordered-values 1)))
            (t (let* ((test (if (> (point-y (elt ordered-values 0))
                                   (point-y (elt ordered-values 1)))
```

Appendix Page 5

```
                    #'>=
                    #'<=))
            (p (position a-value ordered-values :test test
                                 :key #'point-y))
            )
            (cond ((null p) (point-x (elt ordered-values (- len 1))))
                  ((= 0 p)  (point-x (elt ordered-values 0)))
                  ( t      (let ((a (elt ordered-values p))
                                 (b (elt ordered-values (- p 1))) )
                            (linear-interpolate a-value
                                 (point-y a) (point-x a)
                                 (point-y b) (point-x b) )
                ))))))))
(defun pixel-mapping (scale display-units)
  (declare (integer display-units))
  (let* ((d (- display-units 1))
         (len (length scale))
         (s (make-array len :element-type t)))
    (do ((i 0 (+ 1 i)) (a))
        ((>= i len))
      (setf a (elt scale i))
      (setf (elt s i) (list (elt a 0) (round (* (elt a 1) d))))
      )
    (make-mapping s) )
  )

;;;; end of graph-utils

;;; -*- Mode: LISP; Syntax: Common-lisp; Package: MY-APP; Base: 10; Lowercase: Yes -*-
;;; display-basics.lisp 921206 SMP
;;;
;;; 930708 SMP switch Gill Sans to Stone Sans
;;; 930303 SMP fixup to get-simple-text-width 'cause of clim :small trouble
;;; 930209 SMP set to Gill Sans
;;; 930208 SMP fixup of do-text*
;;; 930204 SMP adjusted *large* text style
;;; 930203 SMP moved get-simple-text-width & mac-string-width here
;;; 930201 SMP misc fixups
;;; 930122 SMP fix mac text height to match clim (no leading)
;;; 930120 SMP fixups & Switched L Helvetica Light to Helvetica
;;; 921230 SMP text-style to allow variations
;;; 921217 SMP drawable.lisp separated
;;; 921216 SMP added code for Mac printing
;;; 921211 SMP fix up for CLIM 1.1
```

Appendix Page 6

```
(in-package #.(package-name *package*)) ;hack to supress Lucid warnings (defvar *do-drawing-top* 0 "Relative origin top for drawing")
(defvar *do-drawing-left* 0 "Relative origin left for drawing")
(defvar *do-drawing-foreground* nil "Current foreground color for drawing")
(defvar *do-drawing-background* nil "Current background color for drawing")
(defvar *do-drawing-text-style* nil "Current text style for drawing")
(defvar *do-drawing-text-style-variation* nil "Current text style variation")

(defvar *do-drawing-save* (make-array 100 :element-type t
                                      :adjustable t :fill-pointer t) )
(defvar *white* nil "White color spec")
(defvar *black* nil "Black color spec")
(defvar *small* nil "Small text style")
(defvar *small-bold* nil "Small bold text style")
(defvar *normal* nil "Small text style")
(defvar *large* nil "Large text style")

(defun do-line* (x1 y1 x2 y2)
  (let ((x1a (round (+ x1 *do-drawing-left*)))
        (y1a (round (+ y1 *do-drawing-top* )))
        (x2a (round (+ x2 *do-drawing-left*)))
        (y2a (round (+ y2 *do-drawing-top* )))
        )
   (cond
    #+CORAL
    ((eq *window* :mac-print)
     (let ((pt1 (ccl:make-point x1a y1a))
           (pt2 (ccl:make-point x2a y2a)) )
      (#_moveTo :long pt1)
      (#_lineTo :long pt2)
      ))
    #+CLIM
    (*window*
     (draw-line* *window* x1a y1a x2a y2a)
     )
    (t nil)
    )))
(defun do-point* (x y)
 (let ((xa (round (+ x *do-drawing-left*)))
       (ya (round (+ y *do-drawing-top*))) )
  (cond
   #+CORAL
   ((eq *window* :mac-print)
```

Appendix Page 7

```
     (let ((pt (ccl:make-point xa ya)))
       (#_moveTo :long pt)
       (#_lineTo :long pt)
       ))
     #+CLIM
     (*window*
      (draw-point* *window* xa ya)
      )
     (t nil)
     )))
(defun do-point (p)
  (do-point* (point-x p) (point-y p))
  )
(defun do-cross-point (p &optional (size 1))
  (let* ((x (point-x p))
         (x1 (- x size))
         (x2 (+ x size))
         (y (point-y p))
         (y1 (- y size))
         (y2 (+ y size))
         )
    (do-line* x1 y x2 y)
    (do-line* x y1 x y2)
    ))
(defun do-text* (x y text-string &key (width 1) (height 1) (baseline 0)
              (align-x :left) (align-y :top) )
 #|(do-line* x y (+ x 2) y)
   (do-line* x (+ y height -1) (+ x 2) (+ y height -1))|#
  (let* ((xa (round (+ x *do-drawing-left*)))
         (ya (round (+ y *do-drawing-top*)))
         (xb (+ xa (cond ((eq align-x :right) (- width
                                                 (get-simple-text-string-width
                                                  text-string) ))
                         ((eq align-x :center) (truncate
                                                (- width
                                                   (get-simple-text-string-width
                                                    text-string) ) 2))
                         (t 0) )))
         (yb (+ ya (cond ((eq align-y :bottom) (- height (get-text-descent)))
                         ((eq align-y :baseline) (- height baseline))
                         ((eq align-y :center)  (- height (get-text-descent)
                                                (truncate
                                                 (- height
                                                    (get-text-height))
```

Appendix Page 8

```
                                    2) ))
                  (t (get-text-ascent)) )))
           )
       #|(do-line* (- xb *do-drawing-left*)   (- yb *do-drawing-top*)
              (- xb *do-drawing-left* -2) (- yb *do-drawing-top*))|#
         (cond
          #+CORAL
          ((eq *window* :mac-print)
           (#_moveTo :long (ccl:make-point xb (- yb 1)))
           (ccl:with-pstrs ((text-buff text-string))
             (#_DrawString :ptr text-buff) )
           )
          #+CLIM
          (*window*
           (draw-text* *window* text-string xb yb :align-y :baseline)
           )
          (t nil)
          )))
(defun get-text-ascent ()
 (cond
  #+CORAL
  ((eq *window* :mac-print)
   (ccl:rlet ((fi :fontinfo))
     (#_getFontInfo :ptr fi)
     (ccl:rref fi fontinfo.ascent)
     #|(if (> 0 (ccl:rref fi fontinfo.leading))
       (ccl:rref fi fontinfo.ascent)
       (- (ccl:rref fi fontinfo.ascent)
          (if (< (ccl:rref fi fontinfo.ascent) 13) 2 3) )
     )|#
    ))
  #+CLIM
  (*window*
   (text-style-ascent (medium-text-style *window*) *window*))
  (t nil)
  ))
(defun get-text-height ()
 (cond
  #+CORAL
  ((eq *window* :mac-print)
   (ccl:rlet ((fi :fontinfo))
     (#_getFontInfo :ptr fi)
     (+ (ccl:rref fi fontinfo.ascent)
        (ccl:rref fi fontinfo.descent)
```

Appendix Page 9

```
          ;(ccl:rref fi fontinfo.leading) ;not in clim?
         )))
      #+CLIM
      (*window*
       (text-style-height (medium-text-style *window*) *window*))
      (t nil)
      ))
(defun get-text-descent ()
  (cond
    #+CORAL
    ((eq *window* :mac-print)
     (ccl:rlet ((fi :fontinfo))
       (#_getFontInfo :ptr fi)
       (ccl:rref fi fontinfo.descent)
       ))
    #+CLIM
    (*window*
     (text-style-descent (medium-text-style *window*) *window*))
    (t nil)
    ))
(defclass+ generic-text-style ()
  ((family  :accessible :initform '() :type t)
   (face    :accessible :initform '() :type t)
   (size    :accessible :initform '() :type t)
   (encoded :accessible :initform '() :type t)
   )
  (:documentation "Family (font), face (style), and size triple Optional encoded form.")
  )
(defun make-generic-text-style (&rest args)
  (apply #'make-instance 'generic-text-style args)
  )
(defclass clim-text-style (generic-text-style)
  () ;no additional slots
  (:documentation "Family, face, and size ala CLIM (:sans-serif :roman :small)")
  )
(defun make-clim-text-style (&rest args)
  (apply #'make-instance 'clim-text-style args)
  )
(defclass mac-text-style (generic-text-style)
  () ;no additional slots
  (:documentation "Family, face, and size ala Mac (\"Helvetica\" :plain 9)")
  )
(defun make-mac-text-style (&rest args)
  (apply #'make-instance 'mac-text-style args)
```

Appendix Page 10

```
)
(defclass+ comprehensive-text-style ()
 ((clim :accessible :initform '())
  (mac  :accessible :initform '()) )
 (:documentation "Text style specified for more than one display system.")
)
(defun make-comprehensive-text-style (&rest args)
 (apply #'make-instance 'comprehensive-text-style args)
)
(defun select-variation (text-style variation)
 (if (not (listp text-style))
   text-style
   (or (second (assoc variation text-style))
     (second (first text-style))
     )
 ))
(defun set-text-style (ts &optional (variation nil))
 (setf *do-drawing-text-style* ts)
 (setf *do-drawing-text-style-variation* variation)
 (cond
  #+CORAL
  ((eq *window* :mac-print)
   (with-accessors+ (family face size) (select-variation (mac ts) variation)
    ;(debug-stack 'set-text-style family face size)
    (let ((fnum (ccl:with-pstrs ((name family))
           (ccl:rlet ((fontnumber :long)) ;integer
             (#_GetFNum :ptr name :ptr fontnumber)
             (ccl:%get-signed-word fontnumber))) )
       (face-bit (rest (assoc face
                  '((:plain . 0) (:bold . 1) (:italic . 2)
                   (:underline . 4) (:outline . 8)
                   (:shadow . 16) (:condense . 32)
                   (:extend . 64)) )))
     )
    (#_TextFont :signed-integer fnum)
    (#_TextFace :unsigned-byte  face-bit)
    (#_TextSize :signed-integer size)
   )))
  #+CLIM
  (*window* (with-accessors+ (family face size encoded)
            (select-variation (clim ts) variation)
        (setf (medium-text-style *window*)
            (or encoded (make-text-style family face size)) )
        (stream-string-width *window* " ") ;hack to init font info
```

Appendix Page 11

```
      ))
   (t nil)
   ))
(defun set-text-style-variation (variation)
  (when (not (eq variation *do-drawing-text-style-variation*))
    (set-text-style *do-drawing-text-style* variation)
  ))
#+(and :CORAL :CLIM)
(defun mac-string-width
      (text-string family face size &key (start 0) (end (length text-string)))
  (let ((fnum (ccl:with-pstrs ((name family))
              (ccl:rlet ((fontnumber :long)) ;integer
                (#_GetFNum :ptr name :ptr fontnumber)
                (ccl:%get-signed-word fontnumber))) )
      (face-bit (rest (assoc face
                      '((:plain . 0) (:bold . 1) (:italic . 2)
                        (:underline . 4) (:outline . 8)
                        (:shadow . 16) (:condense . 32)
                        (:extend . 64)) )))
      )
    (#_TextFont :signed-integer fnum)
    (#_TextFace :unsigned-byte face-bit)
    (#_TextSize :signed-integer size)
    )
  (ccl:with-pstrs ((string-buf text-string start end))
    (#_StringWidth :ptr string-buf) )
 )
(defun text-style-clim-size ()
  (size (select-variation (clim *do-drawing-text-style*)
                  *do-drawing-text-style-variation*))
 )
(defun text-style-clim-mac-face ()
  (rest (assoc (face (select-variation (clim *do-drawing-text-style*)
                          *do-drawing-text-style-variation*))
          '((:roman . :plain) (:bold . :bold)
            (:italic . :italic)
            )))
 )
(defun get-simple-text-string-width
      (text-string &key (start 0) (end (length text-string)))
 (cond
 #+:CORAL
 ((eq *window* :mac-print)
  (ccl:with-pstrs ((string-buf text-string start end))
```

Appendix Page 12

```
          (#_StringWidth :ptr string-buf) ))
        #+(and :CORAL :CLIM)
        ((and *window*
             (let ((clim-size (text-style-clim-size)))
               (when (find clim-size '(:tiny :small))
                 (let ((mac-face (text-style-clim-mac-face)))
                   (mac-string-width text-string
                                  (if (eq :bold mac-face)
                                    "Sb 2Stone Sans Semibold"
                                    "2Stone Sans"
                                    )
                                  mac-face
                                  (if (eq :tiny clim-size)
                                    (if (eq :bold mac-face) 10  8)
                                    (if (eq :bold mac-face) 11 11) )
                                  :start start
                                  :end end)
                                       ;g 10 8 11 11 ;s 9 8 11 11
             )))))
        #+:CLIM
        (*window*
         (stream-string-width *window* text-string :start start :end end))
        (t nil)
        ))
(setf *small*
      (make-comprehensive-text-style
       :clim `((nil        ,(make-clim-text-style :family :sans-serif
                                       :face :roman :size :very-small))
               (:small-caps ,(make-clim-text-style :family :sans-serif
                                       :face :roman :size :tiny))
               (:subscripts ,(make-clim-text-style :family :sans-serif
                                       :face :roman :size :tiny))
               )
       :mac `((nil ,(make-mac-text-style :family "2Stone Sans"
                                       :face :plain :size 10)) ;H9 G10 S10
              (:small-caps ,(make-mac-text-style :family "2Stone Sans"
                                       :face :plain :size 9)) ;H8 G9 S9
              (:subscripts ,(make-mac-text-style :family "2Stone Sans"
                                       :face :plain :size 8)) ;H7 G8 S8
              )
       ))
(add-text-style-mapping clim::*coral-device* *standard-character-set*
               (parse-text-style '(:sans-serif :roman :very-small))
               '("2Stone Sans" :plain 10)) ;H9 G10 S10
```

Appendix Page 13

```
(add-text-style-mapping clim::*coral-device* *standard-character-set*
            (parse-text-style '(:sans-serif :roman :tiny))
            '("2Stone Sans" :plain 8)) ;H8 G8 S8
(setf *small-bold*
    (make-comprehensive-text-style
      :clim `((nil      ,(make-clim-text-style :family :sans-serif
                                    :face :bold :size :very-small))
            (:small-caps ,(make-clim-text-style :family :sans-serif
                                    :face :bold :size :tiny))
            (:subscripts ,(make-clim-text-style :family :sans-serif
                                    :face :bold :size :tiny))
            )
      :mac `((nil ,(make-mac-text-style :family "Sb 2Stone Sans Semibold"
                              :face :plain :size 10)) ;H9b G10b Ssb10p
            (:small-caps ,(make-mac-text-style :family "Sb 2Stone Sans Semibold"
                                    :face :plain :size 9)) ;H8b G9b Ssb9p
            (:subscripts ,(make-mac-text-style :family "Sb 2Stone Sans Semibold"
                                    :face :plain :size 9)) ;H7b G9b Ssb9p
            )
      ))
(add-text-style-mapping clim::*coral-device* *standard-character-set*
            (parse-text-style '(:sans-serif :bold :very-small))
            '("Sb 2Stone Sans Semibold" :plain 10)) ;H9b G10b Ssb10p
(add-text-style-mapping clim::*coral-device* *standard-character-set*
            (parse-text-style '(:sans-serif :bold :tiny))
            '("Sb 2Stone Sans Semibold" :plain 10)) ;H8b G10b Ssb10p
(setf *normal*
    (make-comprehensive-text-style
      :clim `((nil      ,(make-clim-text-style :family :sans-serif
                                    :face :roman :size :normal))
            (:small-caps ,(make-clim-text-style :family :sans-serif
                                    :face :roman :size :small))
            (:subscripts ,(make-clim-text-style :family :sans-serif
                                    :face :roman :size :tiny))
            )
      :mac `((nil ,(make-mac-text-style :family "2Stone Sans"
                              :face :plain :size 12))
            (:small-caps ,(make-mac-text-style :family "2Stone Sans"
                                    :face :plain :size 11))
            (:subscripts ,(make-mac-text-style :family "2Stone Sans"
                                    :face :plain :size 10))
            )
      ))
(add-text-style-mapping clim::*coral-device* *standard-character-set*
```

Appendix Page 14

```
                  (parse-text-style '(:sans-serif :roman :normal))
                  '("2Stone Sans" :plain 12))
(add-text-style-mapping clim::*coral-device* *standard-character-set*
                  (parse-text-style '(:sans-serif :roman :small))
                  '("2Stone Sans" :plain 11))
(setf *large* *normal*)
#|(setf *large*
    (make-comprehensive-text-style
      :clim `((nil      ,(make-clim-text-style :family :sans-serif
                                      :face :roman :size 12))
              (:small-caps ,(make-clim-text-style :family :sans-serif
                                      :face :roman :size 12))
              (:subscripts ,(make-clim-text-style :family :sans-serif
                                      :face :roman :size 10))
              )
      :mac `((nil ,(make-mac-text-style :family "2Stone Sans"
                                      :face :plain :size 12))
             (:small-caps ,(make-mac-text-style :family "2Stone Sans"
                                      :face :plain :size 11))
             (:subscripts ,(make-mac-text-style :family "2Stone Sans"
                                      :face :plain :size 10))
             )
      ))
(add-text-style-mapping clim::*coral-device* *standard-character-set*
                  (parse-text-style '(:sans-serif :roman :large))
                  '("2Stone Sans" :plain 14))
(add-text-style-mapping clim::*coral-device* *standard-character-set*
                  (parse-text-style '(:sans-serif :roman 12))
                  '("2Stone Sans" :plain 12))
|#
(defclass+ generic-color ()
  ((red     :accessible :initform '() :type t)
   (green   :accessible :initform '() :type t)
   (blue    :accessible :initform '() :type t)
   (encoded :accessible :initform '() :type t)
   )
  (:documentation "RGB triple and / or encoded form.")
  )
(defun make-generic-color (&rest args)
  (apply #'make-instance 'generic-color args)
  )
(defclass clim-color (generic-color)
  () ;no additional slots
  (:documentation "RGB ala CLIM or an ink")
```

Appendix Page 15

```
)
(defun make-clim-color (&rest args)
 (apply #'make-instance 'clim-color args)
 )
(defclass mac-color (generic-color)
 () ;no additional slots
 (:documentation "RGB ala Mac")
 )
(defun make-mac-color (&rest args)
 (apply #'make-instance 'mac-color args)
 )
(defclass+ comprehensive-color ()
 ((clim :accessible :initform '() :type clim-color)
  (mac  :accessible :initform '() :type mac-color) )
 (:documentation "Color specified for more than one display system.")
 )
(defun make-comprehensive-color (&rest args)
 (apply #'make-instance 'comprehensive-color args)
 )
(setf *white*
    (make-comprehensive-color
      :clim (make-clim-color :encoded +white+)
      :mac (make-mac-color :red #xFFFF :green #xFFFF :blue #xFFFF) ) )
(setf *black*
    (make-comprehensive-color
      :clim (make-clim-color :encoded +black+)
      :mac (make-mac-color :red 0 :green 0 :blue 0) ) )
(defun set-foreground-color (cs)
 (setf *do-drawing-foreground* cs)
 (cond
  #+CORAL
  ((eq *window* :mac-print)
   (with-accessors+ (red green blue) (mac cs)
    (debug-stack 'set-foreground-color red green blue)
    (ccl:rlet ((color :rgbcolor
                :red red :green green :blue blue))
     (#_RGBForeColor :ptr color)
     )
    (debug-stack 'set-foreground-color red green blue)
    ))
  #+CLIM
  (*window* (with-accessors+ (red green blue encoded) (clim cs)
       (setf (medium-foreground *window*)
          (or encoded :ink already set to use
```

Appendix Page 16

```
                        (make-color-rgb red green blue) ) )
        ) )
  (t nil)
  ) )
(defun set-background-color (cs)
  (setf *do-drawing-background* cs)
  (cond
   #+CORAL
   ((eq *window* :mac-print)
    (with-accessors+ (red green blue) (mac cs)
      (debug-stack 'set-background-color red green blue)
      (ccl:rlet ((color :rgbcolor
                  :red red :green green :blue blue))
        (#_RGBBackColor :ptr color)
        )
      (debug-stack 'set-background-color red green blue)
      ) )
   #+CLIM
   (*window* (with-accessors+ (red green blue encoded) (clim cs)
             (setf (medium-background *window*)
                (or encoded ;ink already set to use
                    (make-color-rgb red green blue) ) )
             ))
   (t nil)
   ) )
;;; end of display-basics.lisp ;;; -*- Mode: LISP; Syntax: Common-lisp; Package: MY-APP; Base: 10; Lowercase: Yes -*-
;;; text-fix.lisp 921223 SMP
;;;
;;; 930426 SMP tightened test for subscripts & loosened test for uppercase
;;; 930207 SMP replaced digit-char-p with decimal-char-p
;;; 930202 SMP variable small-caps-threshold added
;;; 930121 SMP numbers -> small caps, but not +- etc
;;; 930120 SMP increase small caps threshold to 3
;;; 921223 SMP initial coding
(in-package #.(package-name *package*)) ;hack to supress Lucid warnings (defconstant white-space (concatenate 'string
                          (string #\Space)
                          (string #\Tab)
                          (string #\Newline) ))
(defun white-space-p (c)
  (find c white-space)
```

Appendix Page 17

```
)
(defun parse-word (line &key (start 0) (end nil))
  "Takes sequence of characters and :start and :end arguments.
Returns (values word-start word-end upper-cnt lower-cnt digit-cnt punc-cnt
hyphenated first-char last-char). Can use word-end as next start."
  (let ((word-start 0)
        (word-end 0)
        (upper-cnt 0)
        (lower-cnt 0)
        (digit-cnt 0)
        (punc-cnt 0)
        (hyphen-cnt 0)
        (hyphenated nil)
        (first-char nil)
        (last-char nil)
        )
    (setf end (if end
                  (min end (length line))
                  (length line) ))
    (when (< start end)
      (setf word-start (or (position-if-not #'white-space-p line
                                            :start start :end end)
                           end))
      (setf word-end word-start)
      (when (< word-start end)
        (setf first-char (elt line word-start))
        (do ((c))
            ((or (>= word-end end)
                 (white-space-p (setf c (elt line word-end))) ))
          (cond ((lower-case-p c) (incf lower-cnt))
                ((or (upper-case-p c) (find c "!$%&(){}[]|\?/"))
                 (incf upper-cnt))
                ((digit-char-p c) (incf digit-cnt))
                ((equal #\- c) (incf hyphen-cnt) (incf punc-cnt))
                ((graphic-char-p c) (incf punc-cnt))
                (t nil)
                )
          (incf word-end)
          )
        (setf last-char (elt line (- word-end 1)))
        (when (equal #\- first-char) (decf hyphen-cnt))
        (when (equal #\- last-char)  (decf hyphen-cnt))
        (setf hyphenated (> hyphen-cnt 0))
        ) ) ;when (< word-end end) when (< start end)
```

Appendix Page 18

```
            (values word-start word-end upper-cnt lower-cnt digit-cnt punc-cnt
                    hyphenated first-char last-char)
            ))
(defparameter *small-caps-threshold-default* 2)
(defun next-word-and-text-category (line &key (start 0) (end nil)
                                        (small-caps-threshold
                                          *small-caps-threshold-default*))
  "Takes sequence of characters and :start and :end arguments.
Returns (values word-start word-end small-caps subscripts hyphenated).
Can use word-end as next start."
  (multiple-value-bind (word-start word-end
                        upper-cnt lower-cnt digit-cnt punc-cnt
                        hyphenated first-char last-char)
                       (parse-word line :start start :end end)
    (declare (ignore last-char punc-cnt))
    (let ((small-caps nil) (subscripts nil))
      (unless (<= 0 (+ upper-cnt digit-cnt) lower-cnt) ;no special text category
        (setf subscripts (and (> digit-cnt 0) (> (+ upper-cnt lower-cnt) 0)
                              (alpha-char-p first-char) ))
        (setf small-caps
              (and (>= (+ upper-cnt digit-cnt) (+ lower-cnt lower-cnt))
                   (or (>= upper-cnt small-caps-threshold)
                       (and (> digit-cnt 0) (>= 0 upper-cnt lower-cnt)))
                   ))
        )
      (values word-start word-end small-caps subscripts hyphenated)
      )))
(defun decimal-char-p (char)
  "Like digit-char-p; true for 0-9 . + -"
  (position char "0123456789.+-")
  )
(defun numeric-run (line &key (start 0) (end nil))
  "Takes sequence of characters and :start and :end arguments.
Returns (values run-end numeric). Can use run-end as next start."
  (let* ((end (if end (min end (length line))
                  (length line) ))
         (start (max 0 (min start end)))
         (run-end end)
         (numeric (decimal-char-p (elt line start)))
         )
    (if numeric
      (let ((p (position-if-not #'decimal-char-p line :start start :end end)))
        (when p
          (setf run-end p)
```

Appendix Page 19

```
      ))
    (let ((p (position-if #'decimal-char-p line :start start :end end)))
      (when p
        (setf run-end p)
        ))
    ) ; end if numeric
  (values run-end numeric)
  ))
(defun subscript-run (line &key (start 0) (end nil))
  "Takes sequence of characters and :start and :end arguments.
Returns (values run-end is-subscript-run). Can use run-end as next start."
  (let* ((end (if end (min end (length line))
              (length line) ))
         (start (max 0 (min start end)))
         (run-end end)
         (is-subscript-run nil)
         (p (position-if #'alphanumericp line :start start :end end))
         )
    (when p
      (if (setf is-subscript-run (decimal-char-p (elt line p))) ;assume subscript
        (let ((p2 (position-if #'alpha-char-p line :start p :end end)))
          (when p2 ;potential subscript would end at next letter
            (setf run-end p2) )
          (setf is-subscript-run
              (not (position-if-not #'decimal-char-p line :start p :end p2)) )
          )
        (let ((p2 (position-if #'decimal-char-p line :start p :end end)))
          (when p2
            (setf run-end (+ 1 (position-if #'alpha-char-p line
                                :start p :end p2 :from-end t) ))
          ))
        )) ; end if decimal-char-p ;end when p
    (values run-end is-subscript-run)
    ))
(defstruct (text-fragment-spec
            (:type list)
            (:constructor make-text-fragment-spec (style string start end)) )
  "List structure for type setting text fragments"
  style
  string
  start
  end
  )
(defun text-setting-parameters (line &key (start 0) (end nil)
```

Appendix Page 20

```
                       (small-caps-threshold
                         *small-caps-threshold-default*))
  "Takes sequence of characters and :start and :end arguments.
Returns list of lists (one per word) of text-fragment-specs."
  (let* ((end (if end (min end (length line))
               (length line) ))
         (start (max 0 (min start end)))
         (words '())
         )
    (do ()
        ((>= start end) (nreverse words))
      (multiple-value-bind (word-start word-end small-caps subscripts hyphenated)
          (next-word-and-text-category line
                                       :start start :end end
                                       :small-caps-threshold
                                       small-caps-threshold)
        (declare (ignore hyphenated))
        (push (do ((f word-start) ;do assemble list of word fragments
                   (w '())
                   )
                  ((>= f word-end) (nreverse w))
                (setf f
                      (if subscripts
                          (multiple-value-bind (run-end is-subscript-run)
                              (subscript-run line :start f
                                             :end word-end)
                            (push (make-text-fragment-spec (cond (is-subscript-run
                                                                  :subscripts)
                                                                 (small-caps
                                                                  :small-caps)
                                                                 (t nil))
                                                           line f run-end)
                                  w)
                            run-end
                            )
                          (multiple-value-bind (run-end is-numeric-run)
                              (numeric-run line :start f
                                           :end word-end)
                            (push (make-text-fragment-spec (cond (is-numeric-run
                                                                  :small-caps)
                                                                 (small-caps
                                                                  :small-caps)
                                                                 (t nil))
                                                           line f run-end)
```

Appendix Page 21

```
              w)
            run-end
          )
      ) ) ) ;if subscripts ;set f ;do for all word fragments
      words) ;push assembled word fragments onto word list
    (setf start word-end)
    ) ) ;do for all words in line
  ) )

;;; end of text-fix

;;; -*- Mode: LISP; Syntax: Common-lisp; Package: MY-APP; Base: 10; Lowercase: Yes -*-
;;; display-text.lisp 921231 SMP
;;;
;;; 930303 SMP changed debugging code in do-fancy-text*
;;; 930207 SMP fixup for lower time axis position
;;; 930203 SMP moved get-simple-text-string-width; added small-caps-threshold
;;; 930129 SMP allow text-parm key arg to do-fancy-text*
;;; 930123 SMP fix for difference between clim & mac baseline
;;; 930120 SMP fixups & subscript drop
;;; 921231 SMP lower level display routines for text
(in-package #.(package-name *package*)) ;hack to supress Lucid warnings
(defun get-text-string-width (text-string
                  &key (start 0) (end nil) (text-parm nil)
                  (small-caps-threshold
                    *small-caps-threshold-default*) )
  (unless text-parm
    (unless end
      (setf end (length text-string)) )
    (setf text-parm (text-setting-parameters text-string :start start :end end
                          :small-caps-threshold
                          small-caps-threshold))
    )
  (set-text-style-variation nil)
  (do* ((space-w (get-simple-text-string-width " "))
        (width (- space-w) (+ width space-w)) ;one word, no spaces
        (words-to-check text-parm (rest words-to-check))
        (word (first words-to-check) (first words-to-check))
        )
       ((endp word) (max 0 width))
    (dolist (fragment word)
      (set-text-style-variation (text-fragment-spec-style fragment))
      (incf width (get-simple-text-string-width
              (text-fragment-spec-string fragment)
```

Appendix Page 22

```
            :start (text-fragment-spec-start fragment)
            :end (text-fragment-spec-end fragment) ) )
   ) ) )
(defun do-fancy-text* (x y text-string &key (width 1) (height 1) (baseline 0)
              (align-x :left) (align-y :top) (text-parm nil)
              (small-caps-threshold *small-caps-threshold-default*) )
#|(do-line* x y (+ x 2) y)
  (do-line* x (+ y 1) x (+ y 1))
  (do-line* x (+ y height -1) (+ x 2) (+ y height -1))
  (do-line* (+ x width -2) y (+ x width -1) y)
  (do-line* (+ x width -1) (+ y 1) (+ x width -1) (+ y 1))|#
  (let ((ya (round (+ y *do-drawing-top*)))
        (xa (round (+ x *do-drawing-left*)))
        (text-parm (or text-parm (text-setting-parameters text-string
                                    :small-caps-threshold
                                    small-caps-threshold)))
    )
    (set-text-style-variation nil)
    (let ((yb (+ ya (cond ;baseline-- mac ascent bottom, clim descent top
                    ((eq align-y :bottom)  (- height (get-text-descent)))
                    ((eq align-y :baseline) (- height baseline))
                    ((eq align-y :center)  (- height (get-text-descent)
                                            (truncate
                                             (- height (get-text-height))
                                             2) ))
                    (t (get-text-ascent)) ) ) )
          (xb (+ xa (cond ((eq align-x :right) (- width
                                                 (get-text-string-width
                                                  text-string
                                                  :text-parm text-parm) ))
                    ((eq align-x :center) (truncate
                                           (- width
                                              (get-text-string-width
                                               text-string
                                               :text-parm text-parm) )
                                           2))
                    (t 0) ) ) )
      )
      (set-text-style-variation nil)
      (do* ((space-w (get-simple-text-string-width " "))
            (subscript-drop (get-text-descent))
            ;(normal-ascent (get-text-ascent))
            (words-to-display text-parm (rest words-to-display))
            (word (first words-to-display) (first words-to-display))
```

Appendix Page 23

```
 )
 ((endp word))
(dolist (fragment word)
 (let ((v (text-fragment-spec-style fragment)))
   (set-text-style-variation v)
   (let ((yb2 (+ yb (cond ((eq :subscripts v)
                 subscript-drop)
                (t 0)
                )))
         )
     #|(do-line* (- xb *do-drawing-left*)   (- yb2 *do-drawing-top*)
           (- xb *do-drawing-left* -2) (- yb2 *do-drawing-top*))|#
     #|(with-accessors+ (family face size) (select-variation
                         (mac *do-drawing-text-style*)
                         *do-drawing-text-style-variation*)
       (debug-stack 'do-fancy-text* xa2 ya3 align-y
                 (text-fragment-spec-string fragment)
                 (text-fragment-spec-start fragment)
                 ;(text-fragment-spec-end fragment)
                 v
                 family face size) )|#
     (cond
      #+:CORAL
      ((eq *window* :mac-print)
       (#_moveTo :long (ccl:make-point xb (- yb2 1)))
       (ccl:with-pstrs ((text-buff (text-fragment-spec-string fragment)
                   (text-fragment-spec-start fragment)
                   (text-fragment-spec-end fragment)))
         (#_DrawString :ptr text-buff) )
       )
      #+:CLIM
      (*window*
       (draw-text* *window* (text-fragment-spec-string fragment)
           xb yb2
           :start (text-fragment-spec-start fragment)
           :end (text-fragment-spec-end fragment)
           :align-y :baseline)
       )
      (t nil)
      ))
   (incf xb (+ (get-simple-text-string-width
          (text-fragment-spec-string fragment)
          :start (text-fragment-spec-start fragment)
          :end (text-fragment-spec-end fragment) ) ) )
```

Appendix Page 24

```lisp
) ) ;let ;dolist fragment
 (incf xb space-w)
 ) ;do* word
 ) ) ) ;let ;let ;defun do-fancy-text*

;;; end of display-text.lisp

;;; -*- Mode: LISP; Syntax: Common-lisp; Package: MY-APP; Base: 10; Lowercase: Yes -*-
;;; display-basics.lisp 921206 SMP
;;;
;;;; 921217 SMP separated from display-basics.lisp
;;;; 921211 SMP fix up for CLIM 1.1
(in-package #.(package-name *package*)) ;hack to supress Lucid warnings (defclass+ drawable ()
  ((ancestors :accessible :initform '() :type sequence)
   (progeny   :accessible :initform '() :type sequence)
   (left      :accessible :initform 0 :type fixnum)
   (top       :accessible :initform 0 :type fixnum)
   (width     :accessible :initform 0 :type fixnum)
   (height    :accessible :initform 0 :type fixnum)
   (foreground :accessible :initform nil)
   (background :accessible :initform nil)
   (text-style :accessible :initform nil)
   )
  (:documentation "Basic info for anything to be drawn / displayed.")
  )
;additional accessors for drawable
(defmethod bottom ((d drawable))
  (+ (top d) (height d) -1)
  )
(defmethod (setf bottom) ((b number) (d drawable))
  (setf (height d) (- b (top d) -1))
  )
(defmethod right ((d drawable))
  (+ (left d) (width d) -1)
  )
(defmethod (setf right) ((b number) (d drawable))
  (setf (width d) (- b (left d) -1))
  )
(defmethod sort-drawable (p)
  (flet ((draw-ordering (d1 d2)
           (or (< (top d1) (top d2))
               (and (= (top d1) (top d2)) (< (left d1) (left d2)))) ))
```

Appendix Page 25

```
    (sort p #'draw-ordering)
   ))
(defvar *drawable-left-offset* 0 "Used to move around printer page")
(defvar *drawable-top-offset* 0 "Used to move around printer page")
(defun with-drawable-options-set (d)
  (vector-push-extend *do-drawing-left* *do-drawing-save*)
  (setf *do-drawing-left* (left d))
  (vector-push-extend *do-drawing-top* *do-drawing-save*)
  (setf *do-drawing-top* (top d))
  (if (foreground d)
    (progn
      (vector-push-extend *do-drawing-foreground* *do-drawing-save*)
      (set-foreground-color (foreground d)) ) )
  (if (background d)
    (progn
      (vector-push-extend *do-drawing-background* *do-drawing-save*)
      (set-background-color (background d)) ) )
  (if (text-style d)
    (progn
      (vector-push-extend *do-drawing-text-style* *do-drawing-save*)
      (set-text-style (text-style d)) ) )
  (incf *do-drawing-left* *drawable-left-offset*)
  (incf *do-drawing-top* *drawable-top-offset*)
  )
(defun with-drawable-options-restored (d)
  (if (text-style d)
    (set-text-style (vector-pop *do-drawing-save*)) )
  (if (background d)
    (set-background-color (vector-pop *do-drawing-save*)) )
  (if (foreground d)
    (set-foreground-color (vector-pop *do-drawing-save*)) )
  (setf *do-drawing-top* (vector-pop *do-drawing-save*))
  (setf *do-drawing-left* (vector-pop *do-drawing-save*))
  )
(defmacro with-drawable-options ((d &optional stream)
                  &body body)
  (declare (ignore stream))
  `(progn (with-drawable-options-set ,d)
      ,@body
      (with-drawable-options-restored ,d)
      ))
(defmacro within-drawable (obj ac &body b)
  (let ((r '()))
    (dolist (a ac
```

Appendix Page 26

```
           `(progn (with-drawable-options-set ,obj)
                  (with-accessors ,(nreverse r) ,obj ,@b)
                  (with-drawable-options-restored ,obj)
                  ))
      (push (if (symbolp a)
              (list a a)
              a)
            r)
      )))
(defgeneric re-draw (drawable-object)
  (:documentation "(Re-)Draw an object on *window*")
  )
(defmethod re-draw ((obj t))
  (if obj (break "~%re-draw ~A~%" obj))
  )
(defmethod re-draw ((obj drawable))
  (within-drawable obj (progeny height width)
    (let ((h (- height 1)) (w (- width 1)))
      (do-line* 0  0 0 h)
      (do-line* 0  h w h)
      (do-line* w  h w 0)
      (do-line* w  0 0 0)
      (do-line* 0  0 w h)
      (do-line* w  0 0 h) )
    (map nil #'re-draw progeny)
    ))

;;; end of drawable.lisp

;;; -*- Mode: LISP; Syntax: Common-lisp; Package: MY-APP; Base: 10; Lowercase: Yes -*-
;; chart-data.lisp 921207 SMP
;;; 930721 SMP handle mm/dd/yy
;;; 930425 SMP allow - & _ in test-name-p
;;; 930312 SMP fix 02 -> O2 (zero -> oh), other name fixes
;;; 930311 SMP addedf tests and drugs; fix up word-list, year & month code
;;; 930304 SMP make db more flexible
;;; 930208 SMP allow name room problem other (word-list & string-from...)
;;; 930131 SMP fix-up
;;; 930129 SMP chart-note class set up
;;; 930127 SMP added note processing (in-package #.(package-name *package*)) ;hack to supress Lucid warnings (defconstant ampicillin-scale #(( 0.0 1.0) ;g/day
```

Appendix Page 27

```
                 (  0.5 0.8)
                 (  1.0 0.6)
                 (  4.0 0.4)
                 ( 12.0 0.2)
                 ( 18.0 0.0) ))
(defconstant aminophylline-scale #((   0 1.0)  ;mg/day needs check
                 (  300 0.8)
                 (  750 0.6)
                 ( 2000 0.4)
                 ( 2500 0.2)
                 ( 3000 0.0) ))
(defconstant bicarbonate-scale #((  6 1.0) ;mmol/l
                 ( 14 0.8)
                 ( 22 0.6)
                 ( 31 0.4)
                 ( 38 0.2)
                 ( 54 0.0) ))
(defconstant blood-pressure-scale #((   0 1.0) ;mmHg
                 (  40 0.8)
                 (  60 0.6)
                 ( 140 0.4)
                 ( 160 0.2)
                 ( 220 0.0) ))
(defconstant blood-urea-nitrogen-scale #((  0.0 1.0) ;needs check
                 (   3.0 0.8)
                 (   5.0 0.6)
                 (  10.0 0.4)
                 (  30.0 0.2)
                 ( 100 0.0) ))
(defconstant chloride-scale #(( 70 1.0) ;mmol/l
                 (  84 0.8)
                 (  97 0.6)
                 ( 110 0.4)
                 ( 125 0.2)
                 ( 140 0.0)) )
(defconstant fahrenheit-scale #(( 32.0 1.0) ;degrees fahrenheit
                 (  94.8 0.8)
                 (  96.8 0.6)
                 ( 100.8 0.4)
                 ( 104.8 0.2)
                 ( 108.8 0.0) ))
(defconstant glucose-scale #((  0.0 1.0) ;mg/dl
                 (  50.0 0.8)
                 (  70.0 0.6)
```

Appendix Page 28

```
                    ( 105.0 0.4)
                    ( 400.0 0.2)
                    (1200.0 0.0) ))
(defconstant hematocrit-scale #(( 0.0 1.0) ;needs check
                    (30.0 0.8)
                    (38.0 0.6)
                    (44.0 0.4)
                    (50.0 0.2)
                    (70.0 0.0) ))
(defconstant input-scale #((    0 1.0) ;ml / 24 hr needs check
                    ( 1200 0.8)
                    ( 2500 0.6)
                    ( 4000 0.4)
                    ( 6000 0.2)
                    (12000 0.0) ))
(defconstant minute-volume-scale #(( 0.0 1.0) ;liters/min needs check
                    ( 1.0 0.8)
                    ( 2.0 0.6)
                    ( 5.0 0.4)
                    ( 7.0 0.2)
                    (10.0 0.0) ))
(defconstant morphine-sulfate-scale #(( 0.0 1.0) ;mg/24hr
                    ( 10.0 0.8)
                    ( 45.0 0.6)
                    ( 90.0 0.4)
                    (150.0 0.2)
                    (200.0 0.0) ))
(defconstant nph-scale #((   0 1.0) ;units/day
                    (   5 0.8)
                    ( 10 0.6)
                    ( 70 0.4)
                    (100 0.2)
                    (200 0.0) ))
(defconstant output-scale #((    0 1.0) ;ml / 24 hr needs check
                    ( 1200 0.8)
                    ( 2500 0.6)
                    ( 4000 0.4)
                    ( 6000 0.2)
                    (12000 0.0) ))
(defconstant pCO2-scale #((15 1.0) ;mmHg ?abnormal ranging
                    (25 0.8)
                    (35 0.6)
                    (45 0.4)
                    (60 0.2)
```

Appendix Page 29

```
                   (150 0.0) ))
(defconstant pH-scale #((6.80 1.0) ;units
                   (7.20 0.8)
                   (7.35 0.6)
                   (7.45 0.4)
                   (7.60 0.2)
                   (7.80 0.0) ))
(defconstant pO2-scale #(( 20 1.0) ;mmHg ?abnormal ranging
                   ( 50 0.8)
                   ( 80 0.6)
                   (105 0.4)
                   (120 0.2)
                   (220 0.0) ))
(defconstant O2Sat-scale #(( 20 1.0) ;percent ?needs check
                   ( 60 0.8)
                   ( 95 0.6)
                   (100 0.4)
                   (110 0.2)
                   (120 0.0) ))
(defconstant phlebotomy-scale #(( 0 1.0) ;ml/24hr ?needs check
                   ( 300 0.8)
                   ( 400 0.6)
                   ( 800 0.4)
                   (1600 0.2)
                   (2400 0.0) ))
(defconstant pulse-scale #(( 0 1.0) ;beats/minute
                   ( 40 0.8)
                   ( 60 0.6)
                   (100 0.4)
                   (140 0.2)
                   (200 0.0) ))
(defconstant potasium-scale #((1.0 1.0) ;mmol/l
                   (2.8 0.8)
                   (3.3 0.6)
                   (4.9 0.4)
                   (5.7 0.2)
                   (7.0 0.0)) )
(defconstant propylthiouracil-scale #(( 0 1.0) ;mg / 24 hr, needs check
                   ( 100 0.8)
                   ( 200 0.6)
                   ( 800 0.4)
                   (1000 0.2)
                   (1200 0.0)) )
(defconstant reg-scale #(( 0 1.0)
```

Appendix Page 30

```
                    ( 1 0.8)
                    ( 2 0.6)
                    (10 0.4)
                    (20 0.2)
                    (50 0.0) ))
(defconstant respiration-scale #(( 0 1.0) ;needs check
                    ( 7 0.8)
                    (10 0.6)
                    (15 0.4)
                    (20 0.2)
                    (50 0.0) ))
(defconstant sodium-scale #((100 1.0) ;mmol/l
                    (120 0.8)
                    (135 0.6)
                    (145 0.4)
                    (160 0.2)
                    (180 0.0)) )
(defconstant sodium-bicarbonate-scale #(( 0 1.0) ;meq / 24hr need check
                    ( 50 0.8)
                    (100 0.6)
                    (200 0.4)
                    (300 0.2)
                    (400 0.0)) )
(defconstant urine-ph-scale #(( 1.0 1.0) ; need check
                    ( 5.0 0.8)
                    ( 6.0 0.6)
                    ( 8.0 0.4)
                    ( 9.0 0.2)
                    (14.0 0.0)) )
(defconstant venous-pressure-scale #(( 0 1.0) ;needs check
                    ( 7 0.8)
                    (10 0.6)
                    (14 0.4)
                    (20 0.2)
                    (50 0.0) ))
(defconstant weight-scale #(( 30 1.0) ;needs to base on est ideal wt or normal
                    ( 40 0.8)
                    ( 45 0.6)
                    ( 90 0.4)
                    (135 0.2)
                    (225 0.0) ))
(defconstant data-descriptor-names
 '(name label type low-normal high-normal mapping)
 )
```

Appendix Page 31

```
(defconstant data-misc
  '((Ampicillin "Ampicillin" drug  1    4  ,ampicillin-scale)
    (BUN "BUN" lab-value   5.0  30.0 ,blood-urea-nitrogen-scale)
    (CO2 "CO2" lab-value   22   31  ,bicarbonate-scale)
    (Cl "Cl" lab-value   97  110  ,chloride-scale)
    (K "K" lab-value   3.3  4.9 ,potasium-scale)
    (Na "Na" lab-value  135  145  ,sodium-scale)
    (pCO2 "pCO2" lab-value 35   45  ,pCO2-scale)
    (pH "pH" lab-value   7.35 7.45 ,pH-scale)
    (pO2 "pO2" lab-value   80  105  ,pO2-scale)
    (O2Sat "O2 Sat" lab-value 95 100  ,O2Sat-scale)
    (Glu "Glu" lab-value  70  105  ,glucose-scale)
    (HCT "HCT" lab-value   38.0  44.0 ,hematocrit-scale)
    (Urine-pH "Urine pH" lab-value 6 8 ,urine-ph-scale)
    (AMINOPHYLLINE "Aminophylline" 750 2000 ,aminophylline-scale)
    (NPH "NPH Insulin" drug 10   70  ,nph-scale)
    (REG "Reg Insulin" drug 2   10  ,reg-scale)
    (MSO4 "Morphine"  drug 45   90  ,morphine-sulfate-scale)
    (NaHCO3 "NaHCO3"  drug 100 200  ,sodium-bicarbonate-scale)
    (PTU "PTU"     drug 200 800  ,propylthiouracil-scale)
    (MVENT "Minute Vent" lab-value 2 10 ,minute-volume-scale)
    (Bled "Phlebotomy" drug 400 1600  ,phlebotomy-scale)
    (R "R" lab-value   10   15  ,respiration-scale)
    (T "T" lab-value   96.8 100.8 ,fahrenheit-scale)
    (P "P" lab-value   60  100  ,pulse-scale)
    (BP "BP" lab-value   60  140  ,blood-pressure-scale)
    (VP "VP" lab-value   10   14  ,venous-pressure-scale)
    (Weight "Weight" lab-value 45 90  ,weight-scale)
    (Input "Input Fluid" drug 2500 4000 ,input-scale)
    (Output "Ouput Fluid" drug 2500 4000 ,output-scale)
    ))
(defun data-descriptor (name descriptor)
  (nth (or (position descriptor data-descriptor-names)
           (length data-descriptor-names) )
       (assoc name data-misc))
  )
(defun word-list (stop in-func)
  (do ((word-list nil) (word (funcall in-func) (funcall in-func)))
      ((or (string-equal word stop) (eq word 'eof))
       (nreverse word-list))
    (push word word-list)
    )
  )
(defun string-from-word-list (word-list) ;util for routines needing strings
```

Appendix Page 32

```
(let ((len -1))
   (dolist (word word-list)
         (incf len (+ (length word) 1) ) )
   (if (<= len 0)
      ""
     (let ((s (make-string len :initial-element #\Space))
           (i 0) )
         (dolist (word word-list)
              (do ((j 0 (+ j 1)))
                 ((>= j (length word)))
                 (setf (elt s i) (elt word j))
                 (incf i)
                 )
              (incf i)
              )
         s) ) ) )
(defclass+ chart-note ()
  ((text-words      :accessible :initform '() :type sequence)
   (signature-names :accessible :initform '() :type sequence)
   (degree          :accessible :initform "" :type string)
   (initials        :accessible :initform "" :type string)
   )
  (:documentation "Parsed text and signature of a chart note")
  )
(defun make-chart-note (&rest args)
  (apply #'make-instance 'chart-note args)
  )
(defconstant degree-list '("LPN" "L.P.N." "MD" "M.D." "MSW" "M.S.W."
               "RN" "R.N." "YMS" "Y.M.S."))
(defun note-and-signature (in-func)
  (let* ((note-text (word-list "signature:" in-func)) ;collect note as word list
         (signature ;initially collect in reverse
           (do ((name-list '()) (name (funcall in-func) (funcall in-func)))
               ((string-equal name "end") name-list)
              (push name name-list)
              ) ) ;do ;signature
         (degree
           (if (not (find (first signature) degree-list :test #'string-equal))
              ""
              (prog1
                 (elt degree-list (logand (lognot 1)
                                 (position (first signature) degree-list
                                          :test #'string-equal) ) )
                 (setf signature (rest signature))
```

Appendix Page 33

```
        ) ) ) ;prog1 ;if ;degree
      (initials
       (if (< (length signature) 2)
        ""
         (do* ((name-length (length signature))
              (initial-string (make-string name-length))
              (i (- name-length 1) (- i 1))
              (names-list signature (rest names-list))
              )
             ((< i 0) initial-string)
           (setf (elt initial-string i)
                 (char-upcase (elt (first names-list) 0)) )
         ) ) ) ;end do* ;end if ;initials
       ) ;let* binding list
     (make-chart-note :text-words note-text :initials initials :degree degree
                 :signature-names (nreverse signature))
   ) )
(defun in-range (lower x upper)
  (and (numberp x) (<= lower x) (<= x upper))
 )
(defun process-lab-data-stream (in-func out-func)
  (do ((year 92)
       (month 7)
       (date 30)
       (hour 6)
       (minute 0)
       (second 0)
       (datum nil)
       (test nil)
       (in (funcall in-func) (funcall in-func))
       )
      ((eq in 'eof))
    (let* ((s (string in)) (first-char (elt (string in) 0)))
      (cond ((and (char-equal first-char #\y) (digit-char-p (elt s 1)))
             (let ((y (read-from-string s nil 'eof :start 1)))
               (cond ((in-range 00 y 99) (setf year y) )
                     ((in-range 1900 y 1999) (setf year (- y 1900)) )
                     (t (format t "Unable to process |~A| as a year~%" s) ) ) )
             )
            ((and (char-equal first-char #\m) (digit-char-p (elt s 1)))
             (let ((m (read-from-string s nil 'eof :start 1)))
               (if (in-range 1 m 12)
                 (setf month m)
                 (format t "Unable to process |~A| as month~%" s) ) )
```

Appendix Page 34

```
)
((and (char-equal first-char #\d) (digit-char-p (elt s 2)))
 (let ((d (read-from-string s nil 'eof :start 1)))
   (if (in-range 1 d 31)
     (setf date d)
     (format t "Unable to process |~A| as date~%" s) ) )
)
((and (digit-char-p first-char) (position #\- s))
 (let* ((p (position #\- s))
        (m (read-from-string s nil 'eof :start 0 :end p ))
        (d (read-from-string s nil 'eof :start (+ p 1)))
        )
   (if (not (eq m 'eof))
     (if (in-range 1 m 12)
       (setf month m)
       (format t "Unable to process |~A| as month~%" s) ) )
   (if (in-range 1 d 31)
     (setf date d)
     (format t "Unable to process |~A| as date~%" s) )
   )
 )
((position #\: s)
 (let* ((p (position #\: s))
        (h (read-from-string s nil 'eof :start 0 :end p))
        (m (read-from-string s nil 'eof :start (+ p 1)))
        )
   (when (not (eq m 'eof))
     (if (in-range 0 h 23)
       (setf hour h)
       (format t "Unable to process |~A| as hour~%" s) ) )
   (if (in-range 0 m 59)
     (progn
       (setf minute m)
       (when (and datum (eq (data-descriptor test 'type) 'drug))
         (funcall out-func
              (encode-universal-time second minute hour
                           date month year)
              test
              datum
              ) )
       )
     ;else
     (format t "Unable to process |~A| as minutes~%" s) )
   )
```

Appendix Page 35

```
)
((position #\/ s)  ;mm/dd/yy or systolic/diasolic
 (let* ((p (position #\/ s))
        (p1 (+ p 1))
        (systolic (read-from-string s nil 'eof :start 0 :end p))
        (diastolic (read-from-string s nil 'eof :start p1))
        (p2 (position #\/ s :start p1))
        (yy (when p2
              (read-from-string s nil 'eof :start (+ p2 1))) )
        )
   (if p2  ;systolic/diastolic/yy -> mm/dd/yy
       (if (and (in-range 1 systolic 12)
                (in-range 1 diastolic 31)
                (<= 0 yy)
                (or (<= yy 99) (in-range 1900 yy 1999)) )
           (setf month systolic
                 date  diastolic
                 year  (if (<= yy 99) yy (- yy 1900))
                 )
         (format t "Unable to process |~A| as mm/dd/yy~%" s)
         )
     ;else systolic/diastolic
     (if (and (in-range 0 systolic 300)
              (or (equal diastolic "p")
                  (in-range 0 diastolic systolic)
                  ))
         (funcall out-func
                  (encode-universal-time second minute hour
                                         date month year)
                  'BP
                  (list systolic
                        (if (numberp diastolic) diastolic 1) )
                  )
       (format t "Unable to process |~A| as blood pressure~%" s)
       )
     )))
((lab-value-p s)
 (funcall out-func
          (encode-universal-time second minute hour date month year)
          test
          (setf datum (read-from-string s)) )
 )
((test-name-p s)
 (setf test (read-from-string s))
```

Appendix Page 36

```
              (cond ((find test '(note notes))
                     (funcall out-func
                            (encode-universal-time second minute hour
                                          date month year)
                            'NOTE
                            (note-and-signature in-func) )
                     (setf test nil)
                     (setf datum nil)
                     )
                    ((find test '(name problem other room))
                     (funcall out-func
                            (encode-universal-time second minute hour
                                          date month year)
                            test
                            (word-list "end" in-func) )
                     (setf test nil)
                     (setf datum nil)
                     )
                    (t (setf datum nil))
                    ))
            (t
             (format t "Unable to recognize |~A|~%" s)
             )
            ) ;cond
       ) ;let
     ) ;do
  )
(defun lab-value-p (s)
  (every #'(lambda (c) (find c "0123456789.+-")) s)
  )
(defun bp-value-p (s)
  (every #'(lambda (c) (find c "0123456789/p")) s)
  )
(defun test-name-p (s)
  (every #'(lambda (c) (or (alphanumericp c) (find c "-_"))) s)
  )
(defun read-chunk (&optional (stream *standard-input*))
  (flet ((read-ch () (read-char stream nil 'EOF))
         (w-spacep (c) (find c '(#\Space #\Tab #\Newline #\Linefeed)))
         (token-endp (c)
                (find c '(#\Space #\Tab #\Newline #\Linefeed #\~ EOF)
                      ))
         )
    (let ((c (read-ch)))
```

Appendix Page 37

```
      (do ()
          ((not (w-spacep c)))
         (setf c (read-ch)) )
      (do ((str (make-array 16 :element-type 'character
                           :fill-pointer 0 :adjustable t))
           )
          ((token-endp c)
           (if (> (length str) 0)
               (coerce str 'string)
               'EOF) )
        (vector-push-extend c str)
        (setf c (read-ch)) )
)))
(defun lab-data-input (&optional (filename-or-stream
                          (concatenate 'string
                                    *data-dir* "lab-data.txt")))
  (let ((lab-data 'nil))
    (with-open-file (stream filename-or-stream :direction :input)
      (process-lab-data-stream #'(lambda () (read-chunk stream))
                    #'(lambda (time test result)
                          (push (list time test result) lab-data)))
      )
    lab-data)
  )
(defun sort-lab-data (l)
  (sort l #'(lambda (a b)
          (let ((aa (string (cadr a))) (bb (string (cadr b))))
            (or (string< aa bb)
                (and (string= aa bb) (< (car a) (car b))))))
        ))
)
(defvar *sorted-lab-data* (sort-lab-data (lab-data-input))
  )
(defun db (table &rest l)
  (declare (ignore l))
  (if (find table '(born display admitted))
    (patient-data-time
     (patient-data-iterator-initialize *sorted-lab-data* table) )
    (string-from-word-list
     (patient-data-value
      (patient-data-iterator-initialize *sorted-lab-data* table) ) )
    ))
(defun patient-data-iterator-initialize (pt-data name)
  (do ((p pt-data (rest p)))
```

Appendix Page 38

```lisp
      ((or (endp p) (equal (second (first p)) name)) p)
      )
   )
(defun patient-data-iterator-update (p)
  (and (not (endp p)) (not (endp (rest p)))
       (eq (second (first p)) (second (second p)))
       (rest p))
  )
(defun patient-data-value (p)
  (third (first p))
  )
(defun patient-data-time (p)
  (first (first p))
  )
(defun value-string (v)
  (cond ((stringp v) v)
        ((numberp v) (format nil "~D" v))
        ((and (typep v 'sequence) (= 2 (length v)))
         (format nil "~A/~A" (elt v 0) (elt v 1)) )
        (t (format nil "~A" v))
        ))
(defun patient-value-string-source (value-name)
  (let* ((v (do ((p *sorted-lab-data* (rest p)))
                ((or (endp p) (equal (second (first p)) value-name)) p)
                )))
        #'(lambda ()
            (let ((x ""))
              (do ((p v (patient-data-iterator-update p)) )
                  ((endp (first p)) (value-string x))
                (setf x (patient-data-value p))
                )
              ))))
(defun patient-data-point-source (value-name)
  (let ((hold-over nil)
        (in-progress nil)
        (init
         (do ((p *sorted-lab-data* (rest p)))
             ((or (endp p) (equal (second (first p)) value-name)) p)
             ))
        )
    #'(lambda (first)
        (when (eq first :first)
          (setf in-progress init)
          (setf hold-over nil) )
```

Appendix Page 39

```lisp
       (unless (and (not hold-over) (endp (first in-progress)))
         (if hold-over
           (prog1
             hold-over
             (setf hold-over nil)
             )
           (prog1
             (let ((x (patient-data-time  in-progress))
                   (y (patient-data-value in-progress)) )
               (when (typep y 'sequence)
                 (setf hold-over (make-point x (second y)))
                 (setf y (first y)) )
               (make-point x y)
               )
             (setf in-progress (patient-data-iterator-update in-progress))
             ))))
    ))

;;; end of chart-data.lisp

;;; -*- Mode: LISP; Syntax: Common-lisp; Package: MY-APP; Base: 10; Lowercase: Yes -*-
;;; text-item.lisp SMP
;;;
;;; 930203 SMP added small-caps-threshold slot & center-ratio-x
;;; 930122 SMP lowered button border
;;; 930121 SMP added text button
;;; 921216 SMP changes for Mac printing
(in-package #.(package-name *package*)) ;hack to supress Lucid warnings (defclass+ text-item (drawable)
  ((text-string  :accessible :initform "")
   (align-x      :accessible :initform :left)
   (align-y      :accessible :initform :top)
   (baseline     :accessible :initform 0 :type 'number) ;offset above bottom
                                    ; typically = descent
   (small-caps-threshold :accessible :initform 2 :type 'number)
   (center-ratio-x :accessible :initform '()) ;relative center for x
                         ; nil -> '(1 2)
   )
  (:documentation "Aligned text")
  )
(defun make-text-item (&rest args)
  (apply #'make-instance 'text-item args)
  )
```

Appendix Page 40

```
(defmethod re-draw ((obj text-item))
 ;(call-next-method)
   (within-drawable obj (text-string width height align-x align-y baseline
                        small-caps-threshold center-ratio-x)
     (if (or (not (eq align-x :center)) (not center-ratio-x))
       (do-fancy-text* 0 0 text-string
                 :width width :height height
                 :align-x align-x :align-y align-y
                 :baseline baseline
                 :small-caps-threshold small-caps-threshold)
       (let* ((text-parm (text-setting-parameters text-string
                                 :small-caps-threshold
                                 small-caps-threshold) )
            (c2 (fraction (first center-ratio-x) (second center-ratio-x)
                     width))
            (w2 (get-text-string-width text-string :text-parm text-parm) )
            (tx (round w2 2))
            (x2 (max 0 (- c2 tx)))
            )
         (when (> (+ x2 w2) width)
           (setq x2 (- width w2)) )
         (do-fancy-text* x2 0 text-string
                   :width w2 :height height
                   :align-x align-x :align-y align-y
                   :baseline baseline
                   :text-parm text-parm)
       )
  )))
(defclass+ text-indicator (text-item)
  ((item          :accessible :initform 'symbol)
   (value-string-source :accessible :initform #'(lambda () ""))
  )
  (:documentation "Text display of finding and value")
 )
(defun make-text-indicator (&rest args) ;**need to handle text size
  (let ((obj (apply #'make-instance 'text-indicator args)))
    (unless (position :align-x args)
      (setf (align-x obj) :center) )
    (unless (position :align-y args)
      (setf (align-y obj) :top) )
    (unless (position :small-caps-threshold args)
      (setf (small-caps-threshold obj) 3) )
    obj
    ))
```

Appendix Page 41

```
(defmethod re-draw :before ((obj text-indicator))
 (setf (text-string obj)
       (concatenate 'string
                (or (data-descriptor (item obj) 'label) "")
                " "
                (funcall (value-string-source obj)) ) )
 )
(defclass+ text-button (text-item)
 ()
 (:documentation "Text button for user to press")
 )
(defun make-text-button (&rest args)
 (let ((obj (apply #'make-instance 'text-button args)))
   (unless (position :align-x args)
     (setf (align-x obj) :center) )
   (unless (position :align-y args)
     (setf (align-y obj) :center) )
   obj
 ))
(defmethod re-draw :before ((obj text-button))
  (within-drawable obj (height width)
   (let ((h (+ (get-text-ascent) 1)) (w (+ width 1)))
     (do-line* -1 -1 -1 h)
     (do-line* -1 h w h)
     (do-line* w h w -1)
     (do-line* w -1 -1 -1)
     )))

;;; end of text-items.lisp

;;; -*- Mode: LISP; Syntax: Common-lisp; Package: MY-APP; Base: 10; Lowercase: Yes -*-
;;; time.lisp 921204 SMP
;;;
;;; 930131 SMP fix-up to hhmm-mmddyy
;;; 930129 SMP added hhmm-mmddyy
(in-package #.(package-name *package*)) ;loading module makes real choice (defconstant time-zero   (encode-universal-time 0 0 0 1 1 0 0))
(defconstant one-second (- (encode-universal-time 1 0 0 1 1 0 0) time-zero))
(defconstant one-minute (- (encode-universal-time 0 1 0 1 1 0 0) time-zero))
(defconstant one-hour   (- (encode-universal-time 0 0 1 1 1 0 0) time-zero))
(defconstant one-day    (- (encode-universal-time 0 0 0 2 1 0 0) time-zero))
(defconstant one-week   (- (encode-universal-time 0 0 0 8 1 0 0) time-zero))
(defconstant four-weeks (- (encode-universal-time 0 0 0 29 1 0 0) time-zero))
```

Appendix Page 42

```
(defconstant one-year  (- (encode-universal-time 0 0 0  1 1 1 0) time-zero))
(defconstant month-abrv
  #("" "Jan" "Feb" "Mar" "Apr" "May" "Jun" "Jul" "Aug" "Sep" "Oct" "Nov" "Dec"))
(defun date-string (time)
  (declare (integer time))
  (multiple-value-bind (s min h d mon y dw daylight-s tz)
              (decode-universal-time time)
    (declare (ignore s min h dw daylight-s tz))
    (format nil "~D.~D.~2,'0D" mon d (mod y 100))
    ))
(defun date-dd-mm (time)
  (declare (integer time))
  (multiple-value-bind (s min h d mon y dw daylight-s tz)
              (decode-universal-time time)
    (declare (ignore s min h y dw daylight-s tz))
    (format nil "~D.~D" mon d)
    ))
(defun hhmm-mmddyy (time)
  (declare (integer time))
  (multiple-value-bind (s min h d mon y dw daylight-s tz)
              (decode-universal-time time)
    (declare (ignore s dw daylight-s tz))
    (format nil "~2,'0D~2,'0D ~2,'0D.~2,'0D.~2,'0D" h min mon d (mod y 100))
    ))
(defun time-string (time &optional (now (get-universal-time)))
  (declare (integer time))
  (multiple-value-bind (s min h d mon y dw daylight-s tz)
              (decode-universal-time time)
    (declare (ignore s dw daylight-s tz))
    (let ( (dt (abs (- now time))) )
      (cond
        ((< dt (- one-day one-hour one-hour))
         (format nil "~2,'0D:~2,'0D" h min))
        ((< dt (- one-year four-weeks four-weeks) #|(* 21 one-day)|#)
         (format nil "~D.~D.~2,'0D" mon d (mod y 100)))
        ((< dt (+ one-year one-year))
         (format nil "~D.~2,'0D" mon (mod y 100)))
        (t
         (format nil "~4,'0D" y))
        ))))
(defun following-midnight (now)        ; daylight savings time capable
  (multiple-value-bind (sec min hr date month year day dlst tz)
              (decode-universal-time now)
    (declare (ignore sec min hr day dlst tz))
```

Appendix Page 43

```lisp
    (multiple-value-bind (sec2 min2 hr2 date2 month2 year2 day2 dlst2 tz2)
               (decode-universal-time
                 (+ (encode-universal-time 0 0 0 date month year)
                    one-day one-hour))
      (declare (ignore sec2 min2 hr2 day2 dlst2 tz2))
      (encode-universal-time 0 0 0 date2 month2 year2)
      ))
)
(defconstant month-max-date #(0 31 29 31 30 31 30 31 31 30 31 30 31)
  "Vector of last day in month 1-Jan 12-Dec")
(defun time-plus (time-start number units)
  (multiple-value-bind (sec min hr date month year day dlst tz)
               (decode-universal-time time-start)
    (declare (ignore sec min hr day dlst tz))
    (case units
      ((:date :day :days)
       (incf date number)
       (when (or (< date 1) (< (aref month-max-date month) date)
             (and (= month 2) (< 28 date)) )
         (decf date number)
         (let* ((midnight (encode-universal-time 0 0 0 date month year))
              (m2 (+ (* number one-day) midnight))
              (m3 (if (>= number 0) (+ m2 one-hour) (- m2 one-hour)))
              )
           (multiple-value-bind (s min h d m y day dlst tz)
                     (decode-universal-time m3)
             (declare (ignore s min h day dlst tz))
             (setf date d)
             (setf month m)
             (setf year y)
             )))
      )
      ((:month :months) (multiple-value-bind
               (y m) (truncate (+ month number) 12)
               (if (>= m 0)
                 (progn
                   (setf month m)
                   (incf year y) )
                 ;else
                 (progn
                   (setf month (+ m 12))
                   (incf year (- y 1)) )
                 )))
      ((:year :years)  (incf year number))
```

Appendix Page 44

```lisp
        )
      (setf date (min (aref month-max-date month) date))
      (when (and (= month 2) (= date 29)
            (or (/= (mod year 4) 0) (= (mod year 100)) 0))
        (setf date 28) )
      (encode-universal-time 0 0 0 date month year)
    ))

#|(defun print-decoded-time (tm &optional (stream *standard-output*))
  (multiple-value-bind (sec min hr date month year day dlst tz)
              (decode-universal-time tm)
    (declare (ignore day))
    (format stream "~&~2,'0D/~2,'0D/~2,'0D ~2,'0D:~2,'0D:~2,'0D TZ:~D DST:~A~%"
            month date year hr min sec tz dlst)
    )
  )|#

;;; end of time.lisp

;;; -*- Mode: LISP; Syntax: Common-lisp; Package: MY-APP; Base: 10; Lowercase: Yes -*-
;;; axis.lisp SMP
;;;
;;;
;;; 930425 SMP fixups for time-axis
;;; 930207 SMP fixups to character positioning
;;; 930123 SMP adjust -- on clinical axis
;;; 930120 SMP fixup to re-draw axis
;;; 921216 SMP changes for Mac printing (in-package #.(package-name *package*)) ;hack to supress Lucid warnings (defclass+ axis (drawable)
  ((orientation       :accessible :initform :horizontal)
   (alternate-placement :accessible :initform nil) ;t for above or right
   (mapping           :accessible :initform nil)
   (frame             :accessible :initform t :type symbol) ;nil t :range
   (frame-length      :accessible :initform 0 :type fixnum) ;0->full range
   (frame-thickness   :accessible :initform 1 :type fixnum)
   (frame-visible     :accessible :initform t :type symbol)
   (grid-ticks        :accessible :initform 0) ;0, n>=2, ???
   (grid-tick-length  :accessible :initform 0 :type fixnum) ;0->full range
   (grid-tick-thickness :accessible :initform 1 :type fixnum)
   (grid-ticks-visible :accessible :initform t :type symbol)
   (grid-ticks-end-off :accessible :initform nil :type symbol)
   (axis-labels       :accessible :initform nil :type list)
```

Appendix Page 45

```
  (axis-visible     :accessible :initform t :type symbol)
  )
 (:documentation "An axis")
 )
(defun make-axis (&rest args)
 (apply #'make-instance 'axis args)
 )
(defclass axis-clinical (axis)
 () ;no new slots
 (:documentation "Vertical, clinical axis ++ + - --")
 )
(defun make-axis-clinical (&rest args)
  (let ((a (apply #'make-instance 'axis-clinical args)))
    (unless (position :text-style args)
      (setf (text-style a) *large*) )
    a
    ))
(defun draw-thick-line (x1 y1 x2 y2 thickness)
  (declare (ignore thickness))
  (do-line* x1 y1 x2 y2)
  )
(defmethod re-draw ((obj axis-clinical))
  (within-drawable obj (alternate-placement width height)
    (let* ((size (truncate (- width 1) 2))
           (size2 (cond ((>= size 3) (truncate size 2))
                        ;((> size 2) (- size 1))
                        (t 1) ))
           (x (if (or alternate-placement (oddp width)) size (+ size 1)))
           (y 0)
           (dy (- height size size))
           )
      (setf y (fraction 1 10 dy))
      (do-line* (- x size) y (+ x size) y)   ; big +
      (do-line* x (- y size) x (+ y size))
      (setf y (+ (fraction 3 10 dy) size))
      (do-line* (- x size2) y (+ x size2) y) ; smaller +
      (do-line* x (- y size2) x (+ y size2))
      (setf y (+ (fraction 7 10 dy) size))
      (do-line* (- x size2) y (+ x size2) y) ; smaller -
      (setf y (+ (fraction 19 20 dy) size))
      (do-line* (- x size) y (+ x size) y) ; big -
      )))

#|(defmethod re-draw ((obj axis-clinical))
```

Appendix Page 46

```
(within-drawable
   obj (orientation alternate-placement
              width height)
   (let* ((char-height (progn (set-text-style *large*)
                       (get-text-string-width "+")
                       (get-text-height)) )
        (start (round char-height 2))
        (range (- height char-height))
        )
    (dolist (markinfo '(("+" *large* 0 4) ("+" *small* 1 4)
              ("-" *small* 3 4) ("-" *large* 4 4)))
      (set-text-style (symbol-value (second markinfo)))
      (do-text* 0 (+ (fraction (third markinfo) (fourth markinfo) range)
              start)
            (first markinfo)
            :align-x :center :align-y :top :width width)
) ) ) )|#
(defmethod re-draw ((obj axis))
 ;(call-next-method)
 (within-drawable
    obj (orientation alternate-placement
             width height
             frame frame-thickness frame-visible
             grid-ticks grid-tick-length
             grid-tick-thickness grid-ticks-visible
             grid-ticks-end-off
             axis-labels axis-visible)
    (flet ((draw-label (i x y x-alignment y-alignment &optional (w 1))
         ;(debug-plot *window* (+ x (left obj)) (+ y (top obj)))
         (unless (>= 0 (length (elt axis-labels i)))
           (do-fancy-text* x y (format nil "~A" (elt axis-labels i))
                 :align-x x-alignment :align-y y-alignment
                 :width w)
) )
   )
   (if (eq orientation :horizontal)
     (progn
      (when (and frame frame-visible)
        (let ((y (if alternate-placement
               (- height frame-thickness)
               0)))
          (draw-thick-line 0 y (- width 1) y frame-thickness) ) )
      (when (and (numberp grid-ticks) (>= grid-ticks 2) grid-ticks-visible)
        (let ((last-i (- grid-ticks 1))
```

Appendix Page 47

```
      (eff-width (- width grid-tick-thickness))
      (upper (if alternate-placement
              (- height frame-thickness grid-tick-length)
              frame-thickness) )
      (lower (if alternate-placement
              (- height frame-thickness 1)
              (+ frame-thickness grid-tick-length -1) ) )
      )
    (flet ((draw-tick-h (i)
             (let ((x (floor (* i eff-width) last-i)))
               (draw-thick-line x upper x lower
                          grid-tick-thickness) ) )
           )
      (unless grid-ticks-end-off (draw-tick-h 0))
      (do ((i 1 (+ i 1)) )
          ((>= i last-i))
        (draw-tick-h i) )
      (unless grid-ticks-end-off (draw-tick-h last-i))
      ) ) )
  (when (and (typep axis-labels 'sequence) (> (length axis-labels) 0)
             axis-visible)
    (let* ((len (length axis-labels))
           (string-len (+ (reduce #'+
                             (map 'list
                                  #'(lambda (s)
                                      (get-text-string-width s) )
                                  axis-labels) )
                          (* (get-text-string-width " ")
                             (- len 1)) ))
           (string-height (get-text-height) )
           (staggered (and (> string-len width)
                           (< string-height
                              (- height frame-thickness
                                 grid-tick-length) ) ))
           (label-top (if alternate-placement
                          0
                          (+ frame-thickness grid-tick-length) ) )
           (label-top-odd (if staggered
                              (+ label-top string-height)
                              label-top))

)
      (flet ((draw-label-h (i x x-alignment)
               (draw-label i x (if (oddp i) label-top-odd label-top)
```

Appendix Page 48

```
                  x-alignment :top)) )
#|(debug-format "~A ~A ~A ~A ~A ~A~%" len string-len
         string-height (- height frame-thickness
                  grid-tick-length)
         staggered label-top label-top-odd)|#
(if (< len grid-ticks) ;time axis labeling hack
 (if simpler-time-axis
   (progn
     (do* ((seq (ordered-values (mapping obj)))
        (i 0 (+ i 1))
        (j (- (length seq) 1) (if (< i (- len 1))
                     (- j 1)
                     1) )
        )
       ((or (>= i (- len 1)) (< j 1)))
       (let ((x (truncate (+ (point-y (elt seq j))
                    (point-y (elt seq (- j 1))))
                 2)))
        (draw-label-h i x :center)
        ))
     (draw-label-h (- len 1) (- width 1) :right)
     )
   ;else
   (do* ((seq (ordered-values (mapping obj)))
       (i 0 (+ i 1))
       (j (- (length seq) 1) (- j 1))
       )
     ((or (>= i len) (< j 1)))
     (let ((x (truncate (+ (point-y (elt seq j))
                  (point-y (elt seq (- j 1))))
               2)))
       (draw-label-h i x :center)
       ))
   )
 ;else normal labeling
 (progn
   (draw-label-h 0 0 :left) ;left label
   (do ((i 1 (+ i 1)) ; middle axis-labels
       (last-i (- len 1))
       (eff-width (- width grid-tick-thickness)) )
     ((>= i last-i))
     (let ((x (floor (* i eff-width) last-i)))
       (draw-label-h i x :center)
       ))
```

Appendix Page 49

```lisp
              (draw-label-h (- len 1) (- width 1) :right) ;right label
                  )
              ) ;end check for time axis
          ))))
      ;else vertical
      (progn
        (when (and frame frame-visible)
          (draw-thick-line (- width frame-thickness) 0
                   (- width frame-thickness) (- height 1)
                   frame-thickness) )
        (when (and (numberp grid-ticks) (>= grid-ticks 2) grid-ticks-visible)
          (let ((last-i (- grid-ticks 1))
                (eff-height (- height grid-tick-thickness))
                (x (- width grid-tick-length))
                )
            (flet ((draw-tick-v (i)
                    (let ((y (floor (* i eff-height) last-i)))
                      (draw-thick-line x y (- width 1) y grid-tick-thickness)
                      )))
              (unless grid-ticks-end-off (draw-tick-v 0))
              (do ((i 1 (+ i 1)))
                  ((>= i last-i))
                (draw-tick-v i) )
              (unless grid-ticks-end-off (draw-tick-v last-i))
              )))
        (when (and (typep axis-labels 'sequence) (> (length axis-labels) 0)
                   axis-visible)
          (let ((len (length axis-labels))
                (w (- width frame-thickness grid-tick-length))
                (eff-height (- height (get-text-ascent)
                               -1) )
                )
            (do ((i 0 (+ i 1))
                 (last-i (- len 1)) )
                ((> i last-i))
              (let ((y (- (floor (* i eff-height) last-i) 1)))
                (draw-label i 0 y (if alternate-placement :left :right) :top
                       w)
                )
              )
            )))
      ))))
;;; end of axis.lisp
```

Appendix Page 50

```lisp
;;; -*- Mode: LISP; Syntax: Common-lisp; Package: MY-APP; Base: 10; Lowercase: Yes -*-
;;; text-log.lisp 920531 SMP
;;;
;;;
;;; 930304 SMP output log in reverse order
;;; 930203 SMP work around clim bug involving width of :tiny text strings
;;; 930131 SMP revised log display
;;; 930129 SMP switched to source from simple log list
;;; 930121 SMP switched to do-fancy-text*
;;; 921216 SMP changes for Mac printing
(in-package #.(package-name *package*)) ;hack to supress Lucid warnings (defclass+ text-log (drawable)
  ((log-source :accessible :initform nil) ;function of :first or :rest
   )
  (:documentation "Log book style text")
  )
(defun make-text-log (log-source &rest args)
  (apply #'make-instance 'text-log :log-source log-source args)
  )
(defmethod re-draw ((obj text-log))
  ;(call-next-method)
  (within-drawable obj (log-source width height)
    (do* ((line-h (+ (get-text-height) 0)) ;allows for leading
          (descent (+ (get-text-descent) 0)) ;allows positioning in line space
          (space-w (get-simple-text-string-width " "))
          (eff-log-height (- height line-h))
          (indent (* 4 space-w))
          (reverse-chronological-log-remaining
            (do ((r '())
                 (e (funcall log-source :first) (funcall log-source :rest)) )
                ((not e) r)
              (push e r) )
            (rest reverse-chronological-log-remaining) )
          (log-point (first reverse-chronological-log-remaining)
                    (first reverse-chronological-log-remaining)
                    ;(funcall log-source :first) (funcall log-source :rest)
                    )
          (y 0 (+ y line-h))
          (x 0 0)
          )
        ((or (not log-point) (>= y eff-log-height)))
      (let* ((date (hhmm-mmddyy (point-x log-point)))
             (note (point-y log-point))
```

Appendix Page 51

```
     )
(with-accessors+ (text-words signature-names initials degree) note
  (do* ((word-width 0)
        (word-parm)
        (word-fits)
        (word-list text-words (rest word-list))
        (word (first word-list) (first word-list))
        )
       ((or (not word) (>= y eff-log-height)))
    (setf word-parm (text-setting-parameters word))
    (setf word-width (get-text-string-width word :text-parm word-parm))
    (setf word-fits (<= (+ word-width x) width) )
    (if (or word-fits (<= (+ indent word-width) width) )
      (progn ;word will fit on next line if not this one
        (unless word-fits
          (setf x indent)
          (incf y line-h)
          (when (>= y eff-log-height) ;don't go past bottom
            (return))
          )
        (do-fancy-text* x y word :text-parm word-parm :height line-h
                  :baseline descent :align-y :baseline)
        #|(do-line* x (+ y line-h (- descent))
              (+ x word-width -1) (+ y line-h (- descent)))|#
        (incf x (+ word-width space-w))
        ) ;end progn
      ;else -- need code to split word
      ) ;end if
    ) ;end do* words in an entry
  (let* ((initials-w (progn (set-text-style-variation :small-caps)
                      (get-simple-text-string-width initials)))
         (degree-w (get-simple-text-string-width degree))
         (date-w (get-simple-text-string-width date))
         (sign-off-w (+ initials-w space-w degree-w space-w date-w))
         )
    (when (> (+ sign-off-w x) width) ;sig & date go down one line
      (incf y line-h)
      (when (>= y eff-log-height) ;don't go past bottom
        (return))
      )
    (do-text* (setf x (- width sign-off-w)) y initials
              :height line-h :baseline descent
              :align-y :baseline)
    (do-text* (incf x (+ initials-w space-w)) y degree
```

Appendix Page 52

```
                    :height line-h :baseline descent
                    :align-y :baseline)
        (do-text* (incf x (+ degree-w space-w)) y date
                    :height line-h :baseline descent
                    :align-y :baseline)
        #|(do-line* x (+ y line-h (- descent))
                    (+ x date-w -1) (+ y line-h (- descent)))|#
        ) ;end let for sign-off
      ) ) ;end with-accessors+ ;end let*
  ) ) ) ;end do* log-points ;end within-drawable ;end defmethod redraw text-log
#|
(defclass+ text-log (drawable)
  ((log-entries :accessible :initform '("0 ???" "1 ???" "2 ???"))
   )
  (:documentation "Log book style text")
  )
(defun make-text-log (log-entries &rest args)
  (apply #'make-instance 'text-log :log-entries log-entries args)
  )
(defmethod re-draw ((obj text-log))
  (within-drawable obj (log-entries width height)
    (do ((y 0) (h (get-text-height))
         (remaining-entries log-entries (rest remaining-entries)) )
        ((null remaining-entries))
      (unless (< width (get-text-string-width (first remaining-entries)))
        (do-fancy-text* 0 y (first remaining-entries)) )
      (incf y h)
      )
    ))

|#

;;; end of text-log.lisp

;;; -*- Mode: LISP; Syntax: Common-lisp; Package: MY-APP; Base: 10; Lowercase: Yes -*-
;;; plot.lisp 921203 SMP
;;;
;;; 930426 SMP trim top & bottom vertical axis points
;;; 930425 SMP fix-up time axis
;;; 930303 SMP eliminate vertical lines from plot with accumulation (in-package #.(package-name *package*)) ;hack to supress Lucid warnings (defclass+ plot-basic (drawable)
```

Appendix Page 53

```
((data-point-source :accessible :initform nil) ;function of :first or :rest
 (h-pixel-mapping   :accessible :initform nil)
 (v-pixel-mapping   :accessible :initform nil)
 (make-mark         :accessible :initform #'(lambda (p)
                                  (when p
                                    (do-cross-point p))))
 )
 (:documentation "X-Y data plot in basic form")
 )
(defmethod re-draw ((obj plot-basic))
 ;(call-next-method)
 (within-drawable
   obj (data-point-source h-pixel-mapping v-pixel-mapping make-mark)
   (do ((data-point (funcall data-point-source :first)
              (funcall data-point-source :rest)))
       ((not data-point))
     (funcall make-mark (map-point h-pixel-mapping v-pixel-mapping data-point))
     )
   (funcall make-mark nil)
  ))
(defclass+ plot-coordinated (plot-basic)
 ((h-mapping-source :accessible :initform nil) ;related axis display
  (v-mapping-source :accessible :initform nil)
  )
 (:documentation "X-Y data plot possibly coordinated with other displays")
 )
(defun make-plot-coordinated (&rest args)
 (apply #'make-instance 'plot-coordinated args)
 )
(defmethod re-draw :around ((obj plot-coordinated))
 (with-accessors+
   (h-pixel-mapping v-pixel-mapping h-mapping-source v-mapping-source) obj
   (setf h-pixel-mapping (mapping-coercion h-mapping-source))
   (setf v-pixel-mapping (mapping-coercion v-mapping-source))
   (call-next-method)
  ))
(defclass+ plot-with-clinical-axis (plot-coordinated)
 ((critical-values :accessible :initform nil)
  (time-points     :accessible :initform nil)
  )
 (:documentation "X-Y data plot with clinical axis")
 )
(defun make-plot-with-clinical-axis (&rest args)
 (apply #'make-instance 'plot-with-clinical-axis args)
```

Appendix Page 54

```
)
(defun make-clinical-axis-mark (pair)
  (do-point pair)
  )
(defmethod re-draw :before ((obj plot-with-clinical-axis))
  (within-drawable
    obj (critical-values h-pixel-mapping v-pixel-mapping time-points)
    (flet ((normal-value-time-points (v)
            (dolist (tp time-points)
              (make-clinical-axis-mark
                (map-point h-pixel-mapping v-pixel-mapping (make-point tp v) ) )
              ))
          (today-start-value-point (val)
            (make-clinical-axis-mark
              (map-point h-pixel-mapping v-pixel-mapping
                (make-point
                  (elt time-points (- (length time-points)
                                      (if simpler-time-axis 1 2) ))
                  val) ) )
            )
          )
      (do ((i 1 (+ i 1))) ;was starting at 0
          ((>= i (- (length critical-values) 1))) ;was >= length
        (if (or (= i 2) (= i 3))
            (normal-value-time-points (elt critical-values i))
          (today-start-value-point  (elt critical-values i))
          ))))) 
(defclass+ plot-with-daily-accumulation (plot-with-clinical-axis)
  ((make-cumulative-mark :accessible :initform #'do-line*))
  (:documentation "X-Y plot with daily cumulatives for drug doses")
  )
(defun make-plot-with-daily-accumulation (&rest args)
  (apply #'make-instance 'plot-with-daily-accumulation args)
  )
(defmethod re-draw :after ((obj plot-with-daily-accumulation))
  (within-drawable
    obj (data-point-source h-pixel-mapping v-pixel-mapping make-cumulative-mark)
    (do ((done nil)
         (start-of-day 0) (end-of-day 0)
         (cumulator 0) ; for interval [start-of-day end-of-day)
         (dose-count 0)
         (front-time 0) (front-data 0)
         #|(last-x 0) (last-y 0)|#
         (data-point (funcall data-point-source :first))
```

Appendix Page 55

```
    )
   (done)
  (if data-point
    (progn (setf front-time (point-x data-point))
          (setf front-data (point-y data-point))
          (setf data-point (funcall data-point-source :rest)) )
     ;else
    (progn (setf end-of-day front-time) ;end day at end of data
          (setf front-data 0)
          (setf done t) )
    ) ;end if data-point
   (if (< front-time end-of-day)
    (progn (incf cumulator front-data)
          (incf dose-count) )
    ;else plot out previous day's accumulation
    (progn
      (when (> dose-count 0)
        (let* ((x1 (map-value h-pixel-mapping start-of-day))
              (x2 (map-value h-pixel-mapping end-of-day))
              (y  (round (map-value v-pixel-mapping cumulator)))
              )
          (when (< x2 x1) (setf x2 x1))
          #|(unless (= last-x 0)
            (funcall make-cumulative-mark last-x last-y x1 y) )|#
          (funcall make-cumulative-mark x1 y x2 y)
          #|(setf last-x x2)
          (setf last-y y)|#
          )
        )
      (when data-point
        (setf start-of-day (time-plus front-time 0 :day))
        (setf end-of-day   (time-plus front-time 1 :day))
        (setf cumulator front-data)
        (setf dose-count 1)
        ) ) ) ;end if front-time < end-of-day
  )))

;;; end of plot.lisp

;;; -*- Mode: LISP; Syntax: Common-lisp; Package: MY-APP; Base: 10; Lowercase: Yes -*-
;;; clinical-page.lisp SMP
;;;
;;; 930426 SMP fixups
;;; 930425 SMP fixups
```

Appendix Page 56

```
;;; 930424 SMP alternate time axis
;;; 930312 SMP fixup hdiv, hm calc; change prob & other to left justified
;;; 930311 SMP change time axis to be based on display from db
;;; 930304 SMP fetch patient name, etc from file; 4 plots / line
;;; 930303 SMP move room to end of first line
;;; 930208 SMP fixup items missing :text-style *small*
;;; 930204 SMP added text line to top
;;; 930203 SMP adjust text-indicator centering, spacing over plot
;;; 930131 SMP text-log fix-up
;;; 930123 SMP fixup of clinical axis
;;; 930122 SMP fixup of lower time axis
;;; 930120 SMP increased indicator spacing
;;; 921216 SMP changes for Mac printing
(in-package #.(package-name *package*)) ;hack to supress Lucid warnings (defparameter copyright-string "©1993 SMPowsner")

(defclass+ clinical-page (drawable)
   ((title      :accessible :initform "Title"           :type string)
    (patient    :accessible :initform "Doe-John"        :type string)
    (page-spec  :accessible :initform nil               :type list)
    (time-spec  :accessible :initform (get-universal-time) :type integer)
    )
   (:documentation "One page graphical display for a patient")
   )
(defvar patient-name "")
(defvar key-problem "")
(defvar other-notes "")
(defvar room-number "")
(defvar today-string "")
(defvar admission-date "")
;(defvar simpler-time-axis T)
(defun make-clinical-page (&rest args)
  (setf patient-name (db 'NAME nil)) ;hack way to get data from file
  (setf key-problem  (db 'PROBLEM nil))
  (setf other-notes (db 'OTHER nil))
  (setf room-number (db 'ROOM nil))
  (setf today-string (date-string (db 'DISPLAY nil)))
  (setf admission-date (db 'ADMITTED nil))
  (let ((p (apply #'make-instance 'clinical-page args)))
    (with-accessors+ (patient page-spec time-spec
                      ancestors progeny
                      #|left top width height bottom|#) p
     ;; might need to base size on stream-spec if no left, top, etc
```

Appendix Page 57

```
(unless time-spec
  (setf time-spec (db 'DISPLAY nil)) )
(let* ((a (cons p ancestors))
    ;; page geometry
    (left   (+ (left p) 1)) ;margins
    (top    (+ (top p)  0))
    (width  (- (width p) 2))
    (height (- (height p) 0))
    (right  (+ left width -1))
    (bottom (+ top height 0))
    (born (db 'BORN patient)) ; time goes from born to time-spec
    ;(copyright-w (stream-string-width *window* copyright-string))
    ;(copyright-ascent (get-text-ascent))
    (name-h (progn (set-text-style *large*)
            (get-text-height) ))
    (next-h name-h)
    (next-d (get-text-descent))
    (next-w (get-text-string-width "Next"))
    (name-m 1)
    (other-notes-h name-h)
    (other-notes-m name-m)
    (headline-h (+ name-h name-m other-notes-h other-notes-m))
    (small-digit-w (progn (set-text-style *small*)
               (get-text-string-width "2") ))
    ;(hdiv 4) (hm 3) ;horz div into n graphs
    (hdiv (round width (* 30 small-digit-w)))
    (hm (round width 150))
    ;(vmw (max 50 (fraction 1 25 width))) ;vert marking width
    (vmw 7)
    (vmm 0) ;vert marking margin
    (vaxw 0) ;vert axis width
    (vaxm 0) ;vert axis margin
    (vertical-axis-width (+ vmw vmm vaxw vaxm) ) ; for ++ -- axis
    (hgrid (+ (floor (- width
              (- (* (+ #|vmw vmm vaxw vaxm|# hm) hdiv) hm)
              vertical-axis-width vertical-axis-width
              (fraction 5 16 width) ;for text col
              )
           hdiv) hm))
    (hwidth (- hgrid #|vmw vmm vaxw vaxm|# hm))
    (tm (fraction 2 3 vmw)) ; text margin
    (text-width (- width tm
            #|tm |#
            vertical-axis-width vertical-axis-width hm
```

Appendix Page 58

```
              (- (* hgrid hdiv) hm))
        )
;(vdiv 6) (vm 4)
(haxh 0) ;horz axis height
(haxm 0) ;horz axis margin
(hlm 0) ;horz marking margin
(hlh (progn (set-text-style *small*)
       (get-text-height)) )
(indicator-height hlh)
(indicator-ascent (get-text-ascent))
(time-axis-height (+ haxm haxh hlm hlh))
(reduced-height (- height headline-h
          time-axis-height time-axis-height))
(vdiv (floor reduced-height
       (* (get-text-height) 7)))
(vm (fraction 3 200 height))
;(hlh (max 7 (fraction 1 (* 8 vdiv) height))) ;horz marking height
(vgrid (+ (floor (- reduced-height (* (- vdiv 1) vm) )
          vdiv) vm))
(vheight (- vgrid haxm haxh hlm hlh vm))
(text-height (- height headline-h
       #| (- (* vgrid vdiv) vm)
          hlh hlh hlm haxh haxm
          tm |#
          name-m next-h ;for next, copyright at bottom
       ))
(admit-date-start (- (time-plus admission-date 0 :day)
           one-hour))
(today-start (- (time-plus time-spec 0 :day) one-hour))
(days-in-hosp (ceiling (- today-start admit-date-start) one-day))
(days-in-hosp5 (* (+ (truncate (- days-in-hosp 1) 5 ) 1) 5) )
(time-axis-end (+ admit-date-start (* days-in-hosp5 one-day)
           one-day one-hour (- one-second) ))
(today-end (- (time-plus time-spec 1 :day) one-second))
(ticks (if simpler-time-axis 8 5))
(time-axis-labels '())
(time-axis-mapping nil)
(time-points '())
(time-points-plotting '())
)
(flet ((grid-left (j) (+ (* j hgrid) left vertical-axis-width))
    (grid-top (i) (+ (* i vgrid) top headline-h
            time-axis-height))
    (mark-time-axis (time y)
```

Appendix Page 59

```
          (push (list time y) time-points) )
    (label-time-axis (time-string)
        (push time-string time-axis-labels))
    (make-time-axis (x y)
        (make-axis #|-for-time|# :left x :top y
                :height time-axis-height #|vheight|#
                :width hwidth #|(+ vmw vmm vaxw)|#
                :orientation :horizontal #|:vertical|#
                :mapping time-axis-mapping
                :axis-labels time-axis-labels
                :grid-ticks ticks :grid-tick-length 0 #|vaxw|#
                :grid-ticks-visible nil
                :frame-visible nil :frame-thickness 0
                :text-style *small*
                ))
    (make-item-indicator (x y item)
        (make-text-indicator :left x :top y
                    :align-x (if simpler-time-axis
                            :right
                            :center)
                    :align-y :bottom
                    :text-style *small-bold*
                    :item item
                    :value-string-source
                    (patient-value-string-source item)
                    :width hwidth :height indicator-height
                    :center-ratio-x '(3 4)
                    ))
    (make-item-axis (x y item &rest args)
      (declare (ignore item))
      (apply #'make-axis
            (concatenate 'list args
                    (list :left x :top y
                        :height vheight #|haxh|#
                        :width (+ vmw vmm vaxw) #|hwidth|#
                        :orientation :vertical #|:horizontal|#
                        :grid-ticks 6 :grid-tick-length vaxw #|haxh|#
                        :grid-ticks-end-off t
                        :grid-ticks-visible nil
                        :frame-visible nil
                        :text-style *small*
                        ))))
    (make-item-plot (x y item time-axis &rest args)
      (when item
```

Appendix Page 60

```
     (apply (if (eq (data-descriptor item 'type) 'drug)
              #'make-plot-with-daily-accumulation
              #'make-plot-with-clinical-axis)
            :data-point-source (patient-data-point-source item)
            :make-mark #'(lambda (p) (when p (do-cross-point p)))
            :left x :top y
            :v-mapping-source (pixel-mapping
                                 (data-descriptor item 'mapping) vheight)
            :h-mapping-source time-axis
            :critical-values
              (nreverse (map 'list #'car
                             (data-descriptor item 'mapping)))
            :time-points time-points-plotting
            #|:horizontal (pixel-mapping
                             (data-descriptor item 'mapping)
                               hwidth)
               :vertical time-axis|#
            :width hwidth :height vheight
            :text-style *small*
            args
            )))
    (paste-in (page-element)
      (when page-element
        (setf (ancestors page-element) a)
        (push page-element progeny)
        ))
    )
  (set-text-style *large*)
  (let* ((name-w (get-text-string-width patient-name))
         (room-w (get-text-string-width room-number))
         (date-w (get-text-string-width today-string))
         (space-3-w (get-text-string-width "aaa"))
         ;(key-w (- width name-w room-w (fraction 5 4 date-w)))
         (key-w (- width name-w space-3-w date-w space-3-w room-w))
         )
    (paste-in (make-text-item :left left :top top
                              :height name-h :width name-w :align-x :left
                              :text-string patient-name
                              :text-style *large*) )
    (paste-in (make-text-item :left (+ left name-w space-3-w) :top top
                              :height name-h :width key-w
                              :align-x :left ::center
                              :text-string key-problem
                              :text-style *large*) )
```

Appendix Page 61

```
(paste-in (make-text-item :left (- right
                           date-w space-3-w room-w
                           #|(fraction 5 4 room-w)|#
                           -1)
                :top top
                :height name-h :width date-w :align-x :right
                :text-string today-string
                :text-style *large*) )
(paste-in (make-text-item :left (- right room-w -1) :top top
                :height name-h :width room-w :align-x :right
                :text-string room-number
                :text-style *large*) )
(paste-in (make-text-item :left left :top (+ name-h name-m)
                :height other-notes-h :width width
                :align-x :left ;:center
                #|:center-ratio-x (list (+ name-w
                                          (round key-w 2))
                                    width)|#
                :text-string other-notes
                :text-style *large*) )
)
(paste-in (make-text-button :left (- right next-w)
                :top (- bottom next-h)
                :height next-h :width next-w
                :baseline next-d
                :align-y :baseline
                :text-string "Next"
                :text-style *large*) )
(set-text-style *small*)
(paste-in (make-text-item :left (- right text-width
                           vertical-axis-width)
                :top (- bottom next-h)
                    #|(- bottom
                        (get-text-ascent)
                        next-d)|#
                :height next-h
                :width (+ text-width
                          vertical-axis-width
                          (- next-w))
                :baseline next-d
                :align-x :center
                :align-y :baseline
                :text-string copyright-string
                :text-style *small*
```

Appendix Page 62

```
                                       ) )
(if simpler-time-axis
 (progn
   (mark-time-axis time-axis-end (- hwidth 1))
   (label-time-axis (format nil "+~Ad" days-in-hosp5))
   (do ((i 5 (- i 1)))
       ((< i 1))
     (mark-time-axis (+ admit-date-start (* i (truncate days-in-hosp5
                                                         5)
                                 one-day))
                 (fraction (+ (* i 2) 3) 15 (- hwidth 1)) )
     (unless (<= i 1) (label-time-axis ""))
     )
   (mark-time-axis admit-date-start (fraction 1 5 (- hwidth 1)))
   (label-time-axis (date-dd-mm admit-date-start))
   (mark-time-axis born 0)
   (label-time-axis "")
   (setf time-points-plotting
         (nreverse (rest (nreverse
                  (map 'list #'car (rest time-points)) ))))
   )
 ;else
 (progn
   (mark-time-axis today-end (- hwidth 1))
   (label-time-axis (date-dd-mm today-end))
   (mark-time-axis today-start
            (fraction 78 100 (- hwidth 1)) )
   (label-time-axis "-wk")
   (mark-time-axis (time-plus time-spec -7 :days)
            (fraction 56 100 (- hwidth 1)) )
   (label-time-axis "-m")
   (mark-time-axis (time-plus time-spec -1 :month)
            (fraction 36 100 (- hwidth 1)) )
   (mark-time-axis born    0)
   (label-time-axis
    (format nil "-~Dy" (truncate (- today-end born) one-year)) )
   (setf time-points-plotting (map 'list #'car (rest time-points)))
   )
 )
(setf time-axis-mapping (make-mapping time-points))
#|(debug-format "~&(- b indicator-height) ~A (-b indicator-ascent next-d) ~A~%"
          (- bottom indicator-height) (- bottom indicator-ascent next-d))|#
(do* ((j 0 (+ j 1)) ;all columns
      (column-left (grid-left j) (grid-left j))
```

Appendix Page 63

```
(plot-left (+ column-left #|vertical-axis-width|#)
        (+ column-left #|vertical-axis-width|#))
(time-axis (make-time-axis plot-left (- bottom indicator-ascent
                            next-d)
                #|(+ (grid-top (- vdiv 1))
                    hlh hlm vheight haxh haxm)|#
                )
            (make-time-axis plot-left (- bottom indicator-ascent
                            next-d)
                #|(+ (grid-top (- vdiv 1))
                    hlh hlm vheight haxh haxm)|#
                ))
)
((>= j hdiv))
(do* ((i 0 (+ i 1)) ;all rows
      (row-top (grid-top i) (grid-top i) )
      (plot-top (+ row-top indicator-ascent 1) ;1 is fudge for crt
            (+ row-top indicator-ascent 1))
      (item (elt-safe page-spec (+ (* i hdiv) j))
            (elt-safe page-spec (+ (* i hdiv) j))) )
    ((>= i vdiv))
    (paste-in (make-item-indicator column-left row-top item))
    (when (= j 0)
      (paste-in
       (make-axis-clinical :left (- column-left vertical-axis-width)
                    :top plot-top
                    :height vheight :width vmw
                    :orientation :vertical
                    :alternate-placement nil)
       ))
    (when (>= j (- hdiv 1))
      (paste-in
       (make-axis-clinical :left (+ column-left hwidth hm)
                    :top plot-top
                    :height vheight :width vmw
                    :orientation :vertical
                    :alternate-placement t)
       ))
    (paste-in (make-item-plot plot-left plot-top item time-axis))
    ) ;end of row do loop
(paste-in time-axis) ;basic time axis at bottom
(paste-in       ;time axis at top of column
 (make-axis :left plot-left :top (+ top headline-h)
        :height time-axis-height #|vheight|#
```

Appendix Page 64

```
                    :width hwidth #|(+ vmw vmm vaxw)|#
                    :orientation :horizontal #|:vertical|#
                    :mapping time-axis-mapping
                    :axis-labels time-axis-labels
                    :grid-ticks ticks :grid-tick-length 0 #|vaxw|#
                    :grid-ticks-visible nil
                    :frame-visible nil :frame-thickness 0
                    :alternate-placement t
                    :text-style *small*
                    ))
         ) ;end of column row work (paste-in (make-text-log ;log-entries
                    (patient-data-point-source 'note)
                    :left #|left|# (- right text-width)
                    :top #|(- bottom text-height)|# (+ top headline-h)
                    :width text-width
                    :height text-height #| height |#
                    :text-style *small*
                    ))
       )
       (setf progeny (sort-drawable progeny))
       (debug-stack p)
       p
     ))))
(defmethod re-draw ((obj clinical-page))
  (within-drawable obj (progeny)
    (map nil #'re-draw progeny)
    ))

;;; end of clinical-page.lisp

;;; -*- Mode: LISP; Syntax: Common-lisp; Package: MY-APP; Base: 10; Lowercase: Yes -*-
;;; main.lisp for graphical chart SMP
;;;
;;;
;;; 930426 SMP rearrange display items
;;; 930312 SMP further display item fixup
;;; 930311 SMP changed display items for Weed NEJM case
;;; 930304 SMP adjusted page size & position, allow scrolling on screen
;;; 921216 SMP added code for direct Mac printing (in-package #.(package-name *package*)) ;hack to supress Lucid warnings (defvar *page-h* (truncate (* 9 72)))
```

Appendix Page 65

```
(defvar *page-w* (truncate (* 7 72)))

(define-application-frame | Graphical Chart  S.M.P |
  () ;super-classes
  ( ;slots
   (command-menu-font :initform *gadget-font*
               :accessor command-menu-font)
   (help-specs    :initform '()
               :accessor help-specs
               :documentation
               "List: strings window font foreground")
   (help-font    :initform nil
               :accessor help-font)
   )
  (:command-table gchart)
  (:panes (#|(title   :title :display-string " Graphical Chart  S.M.P "
               :borders nil)|#
           (graphics :application :scroll-bars :both :borders nil)
       #|(help    :pointer-documentation    :borders nil
               :default-text-style *small-font*
               :display-function 'draw-help-window)|#
           ;(commands :command-menu :default-text-style *small-font* :borders nil)
           ))
  (:layout ((default
          (:column 1
              (graphics :rest)
              #|(:row 1/40
                  (help :rest)
                  (commands 1/2) )|#
              ))
       ))
  )
(define-command (Exit :name "Exit" :keystroke #\e :menu "Exit" :command-table gchart)
          () ;no arguments
  (frame-exit *application-frame*)
  )
(define-command (Draw :name "Draw" :keystroke #\d :menu "Draw" :command-table gchart )
          () ;no arguments
  (let ((w (get-frame-pane *application-frame* 'graphics)))
    (setf *window* w)
    (multiple-value-bind (w h) (window-inside-size w)
      (let* ((margin 1)
           (left margin)     (top margin)
           (width (- w margin margin)) (height (- h margin margin))
```

Appendix Page 66

```
       )
       (prototype-display left top *page-w* *page-h* #|width height|#) ) )
    ))
(define-command (Press :name "Press" :keystroke #\p :menu "Press" :command-table gchart)
        () ;no arguments
  (just-print)
  )
(define-command (Text :name "Text" :keystroke #\t :menu "Text" :command-table gchart )
        () ;no arguments
  (let ((stream (get-frame-pane *application-frame* 'graphics)))
    (review-fonts stream)
    ))
(defun app-sleep-with-exit (ws secs)
  (finish-output ws)
  (let ((end-time (+ (get-internal-real-time)
                     (* internal-time-units-per-second secs))))
    (loop
      (let ((time-to-go (- end-time (get-internal-real-time))))
           (unless (plusp time-to-go) (return nil))
           (multiple-value-bind (gesture type)
               (read-gesture :stream ws :timeout (/ time-to-go internal-time-units-per-second))
             (case type
               ((:timeout) (return nil))
               ((nil)
                (if (characterp gesture)
                    (return t)
                    (frame-exit *application-frame*)))))))))
  )
(defun just-display (&optional (d nil))
  (if (or d (not *root*))
      (set-root d) )
  (multiple-value-bind (left top right bottom)
              (size-work-frame *root* 0 0 (+ 468 16) 648 #|480 560|#)
    (let ((w (open-window-stream :parent *root* :left left :top top
                       :right right :bottom bottom :scroll-bars :both)))
      (setq *window* w)
      (window-expose w)
      (multiple-value-bind (w h) (window-inside-size w)
        (let* ((margin 1)
               (left margin)      (top margin)
               (width (- w margin margin)) (height (- h margin margin))
               )
          (prototype-display left top *page-w* *page-h* #|width height|#) ) )
      (force-output w)
```

Appendix Page 67

```
;(format t "~&Drawn. Hit enter to continue")
;(read-line)
;(close w)
)))
(defun make-and-run-application-frame (root req-left req-top req-right req-bottom)
  (let (app-frame)
    (multiple-value-bind (left top right bottom)
                (size-work-frame root req-left req-top req-right req-bottom)
      (format t "Made Application Size L ~D T ~D R ~D B ~D~%" left top right bottom)
      (setf app-frame (make-application-frame '| Graphical Chart S.M.P |
                              :parent root
                              :left left :top top
                              :right right :bottom bottom))
      (run-frame-top-level app-frame) )
    app-frame)
  )
(defvar *clinical-page* nil)
(defun prototype-display (left top width height)
  (debug-stack-clear)
  (setf (fill-pointer *do-drawing-save*) 0)
  (set-background-color *white*)
  (set-foreground-color *black*)
  (set-text-style *small*)
      (setq *clinical-page* (make-clinical-page :patient "Doe-John"
                                :page-spec #|'(NA CL Glu T
                                    K CO2 nil P
                                    nil nil nil BP
                                    REG NPH AMP)|#
                                  '(pH pCO2 pO2 O2Sat
                                    BUN HCT Weight VP
                                    Na K CO2 Cl
                                    P R T BP
                                    NaHCO3 Bled
                                     Output Input
                                    MVent MSO4
                                     Ampicillin PTU
                                    )
                                :time-spec #|(encode-universal-time
                                    0 0 13 1 10 1992)|#
                                    nil
                                :left left :top  top
                                :width width :height height))
    (re-draw *clinical-page*)
    )
```

Appendix Page 68

```
(defun just-print ()
 (debug-stack-clear)
 (flet ((document-corners (view page-size)
        ;(declare (ignore view page-size))
        ;; a document on 8.5 x 11 paper 1 wide and 1 high
        (debug-stack 'document-corners view page-size)
        (values #@(0 0) (ccl:make-point (round (* 6.5 72))
                                        (round (* 9 72)))))
       (hardcopy-fn (view page-size page-no offset local)
        (declare (ignore view #|page-size|#))
        (debug-stack 'hardcopy-fn (ccl:point-h page-size)
                (ccl:point-v page-size) page-no offset local)
        (unless local (setq offset #@(0 0)))
        (setf *drawable-left-offset* (round (- (ccl:point-h page-size)
                                       *page-w*) 2))
        (setf *drawable-top-offset* (round (- (ccl:point-v page-size)
                                       *page-h*) 2))
        (let ((text "Now is the time for all good men to come to the aid"))
          (ccl::with-font-spec '("Helvetica" 9 :srcor :plain)
           (#_moveTo :long (ccl:add-points #@(50 50) offset))
           #|(ccl:with-pstrs ((text-buff text))
             ;(#_DrawText :ptr text-buff :integer 1 :integer (length text))
             (#_DrawString :ptr text-buff)
             )|#
           (#_moveTo :long (ccl:add-points #@(50 100) offset))
           #|(ccl:with-returned-pstrs ((text-buff text))
             (#_DrawText :ptr text-buff :integer 1 :integer (length text)))|#
           (debug-stack 'pre-redraw *window*)
           (re-draw *clinical-page*)
           (debug-stack 'post-redraw *window*)
           (setq text "When johnny comes marching home again")
           (#_moveTo :long (ccl:add-points #@(50 400) offset))    ;;;***
           #|(ccl:with-returned-pstrs ((text-buff text))
             (#_DrawText :ptr text-buff :integer 1 :integer (length text)))|#
           ))
        )
  (let ((w-save *window*)
        (l-save *drawable-left-offset*)
        (t-save *drawable-top-offset*))
   (unwind-protect
    (progn
     (setq *window* :mac-print)
     ;(setf *drawable-left-offset* 44)
     ;(setf *drawable-top-offset* 44)
```

Appendix Page 69

```
      (ccl::document-hardcopy #'hardcopy-fn #'document-corners :local nil)
      )
    (setf *drawable-top-offset* t-save)
    (setf *drawable-left-offset* l-save)
    (setf *window* w-save) )
   )
 ))
(defun size-work-frame (root
                        desired-left desired-top desired-width desired-height)
  (declare (values left top right bottom))
  (multiple-value-bind (left top right bottom)
              (window-inside-edges root)
    (let ((desired-right (+ desired-left desired-width))
          (desired-bottom (+ desired-top desired-height)))
      (when (> desired-right right)
        (setf desired-right right
              desired-left (max left (- desired-right desired-width))))
      (when (> desired-bottom bottom)
        (setf desired-bottom bottom
              desired-top (max top (- desired-bottom desired-height))))
      (values desired-left desired-top desired-right desired-bottom)))
  )
(defun start ()
  "Runs application after initialization. Cleans up afterwards."
  (configure-graphics)
  #+:Coral (setf *gadget-font*  *small-font*) ;looks better on Mac
  #+:Coral (setf *help-font*    *small-font*)
  #+:Coral (setf *shelp-font*   *small-font*)
  (setf *gchart-application-frame*
      (make-and-run-application-frame *root* 0 0 (+ 468 16) 648 #|480 560|#))
  )
;;;; end of main.lisp
```

We claim:

1. An apparatus for graphical modeling of at least one of a medical and a psychiatric history, comprising
   A. input means for receiving one or more medical/psychiatric history signals, each associated with a clinical data point to modeled, each such history signal having an original temporal value and an original quantitative value,
   B. temporal scaling means for generating a modified temporal value for each of said medical/psychiatric history signals, each said modified temporal value being a function of a time-wise location of the respective original temporal value in an epoch in which that original temporal value belongs with respect to (n) such epochs, where (n) is an integer greater than one, each such epoch being associated with a time period and duration of medical/psychiatric significance, where both a duration and a time-wise distance from a time of interest of each epoch (i) decreases with successive integer values of (i) between one and (n), and
   C. gross-quantitative scale means for generating a modified quantitative value for each of said of medical/psychiatric history signals, each said modified quantitative value being a function of the range of values to which the original quantitative value belongs with respect to (m) designated gross-quantitative ranges, and
   D. modeling means for generating an output signal graphically representative of the modified quantitative values of said medical/psychiatric history signals as a function of respective modified temporal values.

2. An apparatus according to claim 1 wherein said temporal scaling means includes means for selecting said time of interest to be the present.

3. An apparatus according to claim 1, wherein said gross-quantitative scale means includes means for selecting said (m) designated gross-quantitative ranges to include clinically normal, abnormally elevated, markedly elevated, abnormally reduced, and markedly reduced.

4. An apparatus according to claim 1, wherein said temporal scaling means includes means for selecting said (n) temporal regions to include epochs representing a current day, a prior week, a prior month, and a prior period going back to birth.

5. An apparatus according to claim 1, which includes display means for generating a plot on a computer monitor or printer or plotter as a function of said output signal.

6. An apparatus according to claim 5, wherein said display means includes means for normally displaying said (n) temporal regions to span like distances on said plot.

7. An apparatus according to claim 6, wherein said display means includes means for displaying at least a selected temporal region to span greater distances on said plot than others of said temporal regions.

8. An apparatus according to claim 7, wherein said display means includes means for selecting said selected temporal regions to be one representing a prior period of illness.

9. An apparatus according to claim 5, wherein said display means includes means for displaying portions of said plot in different respective colors.

10. An apparatus according to claim 5, wherein said display means includes means for displaying a plurality of said plots in alignment and with like horizontal axes on said display means.

11. A method for graphical modeling of at least one of a medical and a psychiatric history, comprising
    A. receiving one or more medical/psychiatric history signals, each associated with a clinical data point to modeled, each such history signal having an original temporal value and an original quantitative value,
    B. generating a modified temporal value for each of said medical/psychiatric history signals, each said modified temporal value being a function of a time-wise location of the respective original temporal value in an epoch in which that original temporal value belongs with respect to (n) such epochs, where (n) is an integer greater than one, each such epoch being associated with a time period and duration of medical/psychiatric significance, where both a duration and a time-wise distance from a time of interest of each epoch (i) decreases with successive integer values of (i) between one and (n), and
    C. generating a modified quantitative value for each of said of medical/psychiatric history signals, each said modified quantitative value being a function of the range of values to which the original quantitative value belongs with respect to (m) designated gross-quantitative ranges, and
    D. generating an output signal graphically representative of the modified quantitative values of said medical/psychiatric history signals as a function of respective modified temporal values.

12. A method for graphical modeling of at least one of a medical and a psychiatric history, comprising
    A. receiving one or more medical/psychiatric history data points to be modeled, each data point being associated with a time value and a quantitative value,
    B. generating a data modelling point having first and second coordinates, the first coordinate being a function of (i) a relative location of an epoch in which the time value associated with that data point belongs with respect to a plurality of epochs, and (ii) a relative location of that time value within that epoch,
    the second coordinate being a function of a range of values to which the quantitative value associated with that data value with respect to a plurality of ranges.

13. A method according to claim 12, wherein step (B) includes selecting said plurality of ranges to include clinically significant ranges.

14. An apparatus according to claim 13, wherein step (B) includes selecting said plurality of ranges to include one or more of clinically normal, abnormally elevated, markedly elevated, abnormally reduced, and markedly reduced.

15. An apparatus according to claim 12, wherein step (B) includes selecting said plurality of epochs to include epochs of clinical significance.

16. An apparatus according to claim 15, wherein step (B) includes selecting said plurality of epochs to include one or more of a current day, a prior week, a prior month, and a prior period going back to birth.

17. A method according to claim 12, including the step of displaying said data modelling points.

18. A method according to claim 12, including the step of displaying said data modelling points on an output device including any of a computer monitor, a printer, and a plotter.

19. A method according to claim 17, wherein the step of displaying said data modelling points includes the step of normally displaying said plural epochs to span like distances as displayed by an output device.

20. A method according to claim 17, wherein the step of displaying said data modelling points includes the step of displaying at least a selected epoch to span a greater distance than others of said temporal regions as displayed by an output device.

21. A method according to claim 20, including the step of selecting said selected epoch to be one representing a prior period of illness.

* * * * *